(12) United States Patent
Kawase

(10) Patent No.: US 11,704,933 B2
(45) Date of Patent: *Jul. 18, 2023

(54) INFORMATION PROCESSING APPARATUS, INFORMATION PROCESSING METHOD, AND PROGRAM

(71) Applicant: NEC Corporation, Tokyo (JP)

(72) Inventor: Nobuaki Kawase, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/670,643

(22) Filed: Feb. 14, 2022

(65) Prior Publication Data

US 2022/0165090 A1    May 26, 2022

Related U.S. Application Data

(63) Continuation of application No. 16/611,121, filed as application No. PCT/JP2018/048090 on Dec. 27, 2018, now Pat. No. 11,361,588.

(51) Int. Cl.
*G06V 40/10* (2022.01)
*G06V 40/16* (2022.01)
(Continued)

(52) U.S. Cl.
CPC ............ *G06V 40/172* (2022.01); *G06V 10/98* (2022.01); *G06V 20/52* (2022.01); *G06V 40/103* (2022.01);
(Continued)

(58) Field of Classification Search
CPC .. G06V 40/172; G06V 40/168; G06V 10/993; G06V 10/98; G06V 20/52; G06V 40/103; G06V 40/161; G06V 40/70
See application file for complete search history.

(56) References Cited

U.S. PATENT DOCUMENTS

2011/0311112 A1*  12/2011  Matsuyama ......... G06V 40/171
                                                                            382/118
2013/0243271 A1    9/2013  Kawahara et al.
(Continued)

FOREIGN PATENT DOCUMENTS

JP      2012-212217 A    11/2012
JP      2013-186546 A     9/2013
(Continued)

OTHER PUBLICATIONS

International Search Report and Written Opinion corresponding to PCT/JP2018/048090 dated Apr. 2, 2019, (10 pages).
(Continued)

*Primary Examiner* — Md K Talukder

(57) ABSTRACT

An information processing apparatus (100) includes an acquisition unit (122) that acquires a first image from which person region feature information regarding a region including other than a face of a retrieval target person is extracted, a second image in which a collation result with the person region feature information indicates a match, and a facial region is detected, and result information indicating a collation result between face information stored in a storage unit and face information extracted from the facial region, and a display processing unit (130) that displays at least two of the first image, the second image, and the result information on an identical screen.

21 Claims, 26 Drawing Sheets

(51) Int. Cl.
*G06V 10/98* (2022.01)
*G06V 20/52* (2022.01)
*G06V 40/70* (2022.01)

(52) U.S. Cl.
CPC .......... *G06V 40/161* (2022.01); *G06V 40/168* (2022.01); *G06V 40/70* (2022.01); *G06V 10/993* (2022.01)

(56) References Cited

U.S. PATENT DOCUMENTS

| | | | |
|---|---|---|---|
| 2014/0270370 A1* | 9/2014 | Saito | G06F 18/40 382/103 |
| 2015/0339516 A1* | 11/2015 | Yano | G06T 7/74 382/118 |
| 2018/0018503 A1* | 1/2018 | Wang | G06V 40/167 |
| 2018/0253603 A1* | 9/2018 | Yamamoto | G06T 7/174 |
| 2018/0300540 A1* | 10/2018 | Swisher | G06F 18/24133 |
| 2018/0341803 A1 | 11/2018 | Matsushita et al. | |
| 2018/0341835 A1* | 11/2018 | Siminoff | G08B 13/196 |
| 2019/0147156 A1* | 5/2019 | Burri | G06V 40/174 713/186 |
| 2020/0038103 A1* | 2/2020 | Pappone | A61M 25/1011 |
| 2020/0076876 A1* | 3/2020 | Zhang | H04W 12/065 |
| 2020/0107164 A1* | 4/2020 | Lopatin | H04W 12/104 |
| 2021/0312164 A1* | 10/2021 | Kawase | G06V 10/98 |

FOREIGN PATENT DOCUMENTS

| | | |
|---|---|---|
| JP | 2013-196043 A | 9/2013 |
| JP | 2016-002547 A | 1/2016 |
| JP | 2017-182210 A | 10/2017 |
| JP | 2018-198056 A | 12/2018 |
| WO | WO-2006/013765 A1 | 2/2006 |

OTHER PUBLICATIONS

Extended European Search Report for EP Application No. EP18945226.1 dated Nov. 29, 2021.

Tome Pedro et al: "Soft Biometrics and their Application in Person Recognition at a Distance", IEEE Transactions on Information Forensics and Security, IEEE, USA, vol. 9, No. 3, Mar. 1, 2014 (Mar. 1, 2014), pp. 464-475.

Koo Ja et al: "CNN-Based Multimodal Human Recognition in Surveillance Environments", SENSORS, vol. 18, No. 9, Sep. 11, 2018 (Sep. 11, 2018), pp. 1-34.

U.S. Notice of Allowance for U.S. Appl. No. 16/611,121 dated Feb. 18, 2022.

Singapore Office Action for SG Application No. 11202106468Q, dated Nov. 25, 2022.

* cited by examiner

INFORMATION PROCESSING APPARATUS, INFORMATION PROCESSING METHOD, AND PROGRAM

CROSS-REFERENCE TO RELATED APPLICATIONS

The present application is a continuation application of U.S. patent application Ser. No. 16/611,121 filed on Nov. 5, 2019, which is a National Stage Entry of international application PCT/JP2018/048090, filed on Dec. 27, 2018, the disclosures of all of which are incorporated in their entirety by reference herein.

TECHNICAL FIELD

The present invention relates to an information processing apparatus, an information processing method, and a program, capable of performing an image recognition process.

BACKGROUND ART

In recent years, a technique of detecting a person matching a desired condition by using an image has been developed. For example, Patent Document 1 clos a system which judges whether or not a predetermined person such as a missing person or a wanted criminal is included in moving images captured in a street or the like. The system generates feature data of a face image included in each frame of captured images, compares pieces of the generated feature data, and thus sorts the feature data for each person such that feature data of an identical person is included in a single group. The system determines representative feature data for each person on the basis of the sorted feature data, and transmits at least one of the determined feature data and a face image corresponding to the determined feature data to a face recognition apparatus as representative face data. The face recognition apparatus collates the transmitted data with face data of a predetermined person registered in a face data dictionary.

Patent Document 2 discloses an image processing apparatus which identifies an identical person from images captured by different cameras, and thus automatically tracks the person. The different cameras capture images of the person from different directions.

Patent Document 3 discloses a technique of detecting a walking state of a person from temporally-distant frames or person image sequences obtained by different cameras, and judging whether or not persons included in different image sequences are the same person on the basis of the walking state.

RELATED DOCUMENT

Patent Document

[Patent Document 1] Japanese Unexamined Patent Application Publication No. 2017-182210
[Patent Document 2] Japanese Unexamined Patent Application Publication No. 2015-2547
[Patent Document 3] International Publication No. WO2006/013765

SUMMARY OF THE INVENTION

Technical Problem

The present inventor has examined a new technique for identifying a person who cannot be identified in an original image by using image processing on other images. In other words, an object of the present invention is to provide a technique for identifying a person who cannot be identified in an original image by using image processing on other images.

Solution to Problem

In each aspect of the present invention, the following configuration is employed to solve the above-described problem.

A first aspect relates to an information processing apparatus.

A first information processing apparatus related to the first aspect includes an acquisition unit that acquires a first image from which person region feature information regarding a region including other than a face of a retrieval target person is extracted, a second image in which a collation result with the person region feature information indicates a match, and a facial region is detected, and result information indicating a collation result between face information stored in a storage unit and face information extracted from the facial region; and a display processing unit that displays at least two of the first image, the second image, and the result information on an identical screen.

A second information processing apparatus related to the first aspect includes an acquisition unit that acquires a second image in which a collation result with person region feature information regarding a region including other than a face of a retrieval target person indicates a match, and a facial region is detected, and result information indicating a collation result between face information stored in a storage unit and face information extracted from the facial region; and a display processing unit that displays the acquired second image and result information on an identical screen.

A third information processing apparatus related to the first aspect includes an acquisition unit that acquires a first image from which person region feature information regarding a region including other than a face of a retrieval target person is extracted, and result information indicating a collation result between face information extracted from a second image in which a collation result with the person region feature information indicates a match, and a face information stored in a storage unit; and a display processing unit that displays the acquired first image and result information on an identical screen.

A second aspect relates to an information processing method executed by at least one computer.

A first information processing method related to the second aspect, executed by an information processing apparatus, includes: acquiring a first image used to generate person region feature information indicating a feature of a retrieval target person, a second image in which a collation result with the person region feature information indicates a match, and a facial region is detected, and result information indicating a collation result between face information stored in a storage unit and face information extracted from the facial region; and displaying at least two of the first image, the second image, and the result information on an identical screen.

A second information processing method related to the second aspect, executed by an information processing apparatus, includes: acquiring a second image in which a collation result with person region feature information regarding a region including other than a face of a retrieval target person indicates a match, and a facial region is detected, and result information indicating a collation result between face information stored in a storage unit and face information extracted from the facial region; and displaying the acquired second image and result information on an identical screen.

A third information processing method related to the second aspect, executed by an information processing apparatus, includes: acquiring a first image from which person region feature information regarding a region including other than a face of a retrieval target person is extracted, and result information indicating a collation result between face information extracted from a second image in which a collation result with the person region feature information indicates a match, and a face information stored in a storage unit; and displaying the acquired first image and result information on an identical screen.

It should be noted that other aspects of the present invention may relate to a program causing at least one computer to execute the method of the second aspect, and may relate to a computer readable storage medium storing such a program. The storage medium includes a non-transitory medium.

The computer program includes computer program codes causing a computer to execute the control method of the information processing apparatus on the information processing apparatus when the program is executed by the computer.

It should be noted that any combination of the above-described constituent elements, and expressional conversion of the present invention among a method, an apparatus, a system, a storage medium, a computer program, and the like is also effective as an aspect of the present invention.

Various constituent elements of the present invention are not necessarily required to be individually independent elements. For example, a plurality of constituent elements may be configured as a single member, a single constituent element may be configured with a plurality of members, any constituent element may be a part of another constituent element, and a part of any constituent element may overlap a part of another constituent element.

A plurality of procedures are sequentially described in the method and the computer program of the present invention, but the order of description does not limit an order of executing the plurality of procedures. Thus, in a case where the method and the computer program of the present invention are executed, the order of the plurality of procedures may be changed within the scope without contradiction to contents thereof.

The plurality of procedures of the method and the computer program of the present invention are not limited to being respectively executed at different timings. Thus, another procedure may occur during execution of any procedure, and an execution timing of any procedure may partially or entirely overlap an execution timing of another procedure.

Advantageous Effects of Invention

According to each aspect above, it is possible to provide a technique for identifying a person who cannot be identified in an original image by using image processing on other images.

BRIEF DESCRIPTION OF THE DRAWINGS

The above-described object, and other objects, features, and advantages will become apparent throughout preferable example embodiments described below and the accompanying drawings.

DESCRIPTION OF EMBODIMENTS

Figure 1:
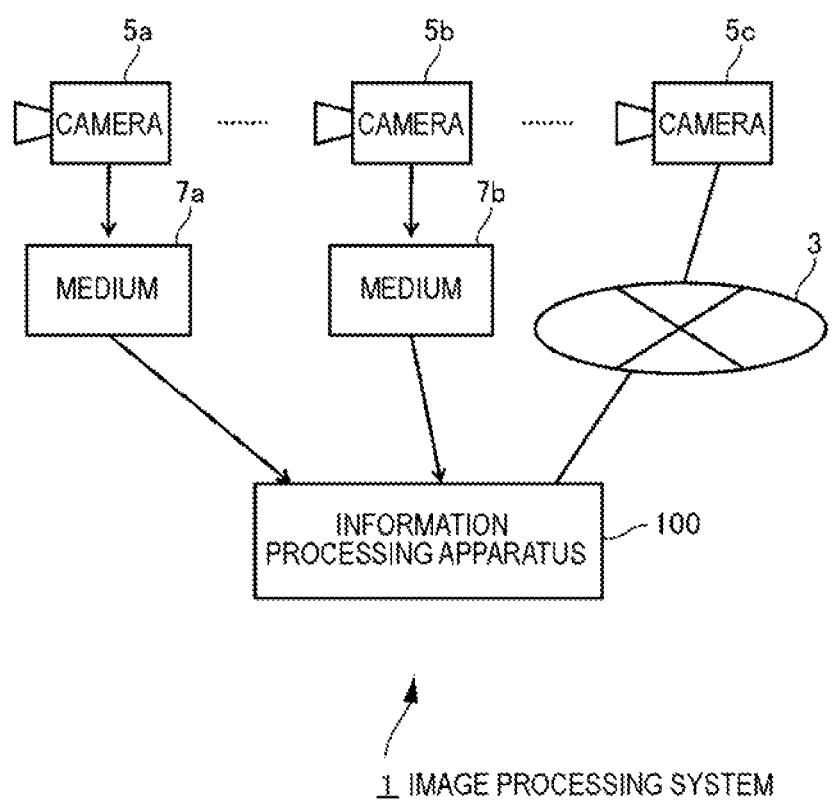
FIG. 1 is a conceptual diagram illustrating a configuration of an image processing system according to an example embodiment of the present invention.

Hereinafter, example embodiments of the present invention will be described with reference to the drawings. The same constituent elements are given the same reference numerals throughout all the drawings, and description thereof will not be repeated as appropriate.

In each drawing of the present specification, a configuration of a portion having no relation to the essence of the present invention is omitted and is not illustrated.

First Example Embodiment

FIG. 1 is a conceptual diagram illustrating a configuration of an image processing system according to an example embodiment of the present invention.

An image processing system 1 includes an information processing apparatus 100. The information processing apparatus 100 retrieves a certain person from images captured by a plurality of cameras 5a, 5b, 5c, . . . (referred to as a "camera 5" or "cameras 5" in a case where the cameras are not particularly required to be differentiated from each other).

For example, there is a case where only a retrieval target person's back is captured in, for example, an original image (second image 22), and thus face recognition cannot be performed. In this case, the information processing apparatus 100 finds a matching candidate, who resembles the retrieval target person, from other images (first images 10) captured by the cameras 5 by using information (hereinafter, referred to as first feature information) such as a physique, and the person is identified through face recognition by using an image in which the face thereof is shown among the images.

It should be noted that, in the example embodiment, the "acquisition" includes at least one of an apparatus fetching (active acquisition) data or information stored in another apparatus or a storage medium and the apparatus inputting (passive acquisition) therein data or information which is output from another apparatus. As an example of the active acquisition, there are a case where an apparatus sends a request or an inquiry to another apparatus, and receives a response thereto, and a case where the apparatus accesses another apparatus or a storage medium, and reads data or information. As an example of the passive acquisition, there is a case where a host apparatus receives delivered information (alternatively, transmitted information or information sent through push notification). The "acquisition" may include selectively acquiring data or information from received data or information, or selectively receiving delivered data or information.

The camera 5 is a camera including a lens and an imaging element such as a charge coupled device (CCD) image sensor. The camera 5 is, for example, a network camera such as an Internet Protocol (IP) camera. The network camera has, for example, a wireless local area network (LAN) communication function, and is connected to the information processing apparatus 100 through a communication network, that is, a relay apparatus (not illustrated) such as a router. The cameras 5 may be so-called surveillance cameras provided in a street or inside and outside a building. The camera 5 may include a mechanism which tracks movement of a specific person in accordance with the movement, and performs control of a camera main body or a direction of a lens, zoom control, or focusing.

The camera 5 and the information processing apparatus 100 may not be connected to each other, may be directly connected to each other, and may be indirectly connected to each other through a communication network 3 or the like. In a case where the camera 5 and the information processing apparatus 100 are not connected to each other, for example, image data is read and acquired from a medium 7a and a medium 7b (hereinafter, referred to as a "medium 7" or "media 7" in a case where the media are not particularly required to be differentiated from each other) which respectively store images captured by the camera 5a and the camera 5b.

The camera 5c in an example of being connected to the information processing apparatus 100 through the communication network 3 or the like has, for example, a wireless local area network (LAN) communication function, and is connected to the information processing apparatus 100 through the communication network 3, that is, a relay apparatus (not illustrated) such as a router. The camera 5c is preferably a network camera such as an Internet Protocol (IP) camera.

Regarding a timing at which an image is transmitted from the camera 5 to the information processing apparatus 100, an image may be delivered in real time, for example, through streaming delivery, and images corresponding to a predetermined period may be transmitted at a predetermined interval. The transmission timing may be selected as appropriate on the basis of a memory capacity, a communication capacity, or image processing performance of the camera 5 or the information processing apparatus 100, or a communication situation or the like between the camera 5 and the information processing apparatus 100, and may be changed depending on a situation change.

For example, image data captured by the camera 5 may be directly transmitted to the information processing apparatus 100, and the information processing apparatus 100 may sequentially receive the image data. A storage apparatus (not illustrated) which can be accessed by both of the camera 5 and the information processing apparatus 100 may be provided. In this case, image data captured by the camera 5 is stored in the storage apparatus. The information processing apparatus 100 reads the image data from the storage apparatus.

Here, the image data may be at least one of a still image and a moving image. A data format, a file format, a file size, an image size, a resolution of an image, a frame rate of moving images, and the like are not particularly limited, and data or files of various formats may be employed according to specifications, standards, performance, and the like of the camera 5 and the information processing apparatus 100, or image analysis processing performance or accuracy thereof. At least one frame of the image data may be at least one of a first image 10 and a second image 22 which will be described later.

Figure 2A:
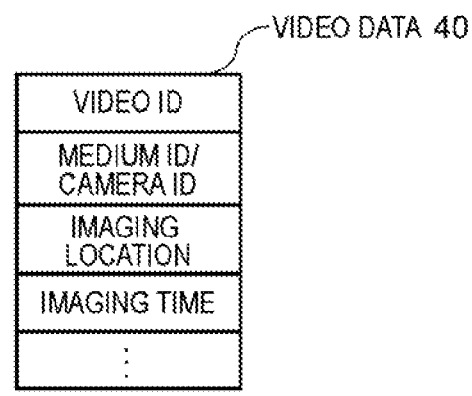
FIGS. 2A and 2B are diagrams illustrating examples of data structures of video data and image data.

FIG. 2A is a diagram illustrating an example of a data structure of video data 40. The video data 40 is captured by a certain camera 5, and is received from the camera 5 or is stored on the medium 7. The video data 40 includes pieces of information indicating a video ID for identifying the video data 40, a medium ID for identifying the medium 7 storing the video data 40 or a camera ID for identifying the camera 5 capturing the video data 40, and imaging conditions (for example, an imaging location and imaging time) of the camera 5, and the entity of the video data.

Figure 2B:
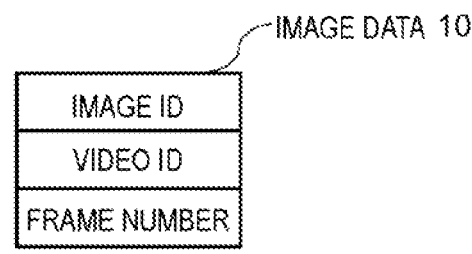

FIG. 2B is a diagram illustrating an example of a data structure of the first image 10. The first image 10 is a part of the video data 40 captured by a certain camera 5, and may be any frame of the video data 40. The first image 10 includes pieces of information indicating an image ID for identifying the image and a video ID for identifying the video data 40 which is the source of the image, and the entity of image data. In a case where the entity of image data is a frame, the first image 10 further includes information indicating a frame number for identifying the frame. The image ID may be a file name. It should be noted that the first image 10 is an image from which a retrieval target person is retrieved unlike the second image 22. The first image 10 may be captured by a camera 5 which is different from a camera capturing the second image 22.

Figure 3:
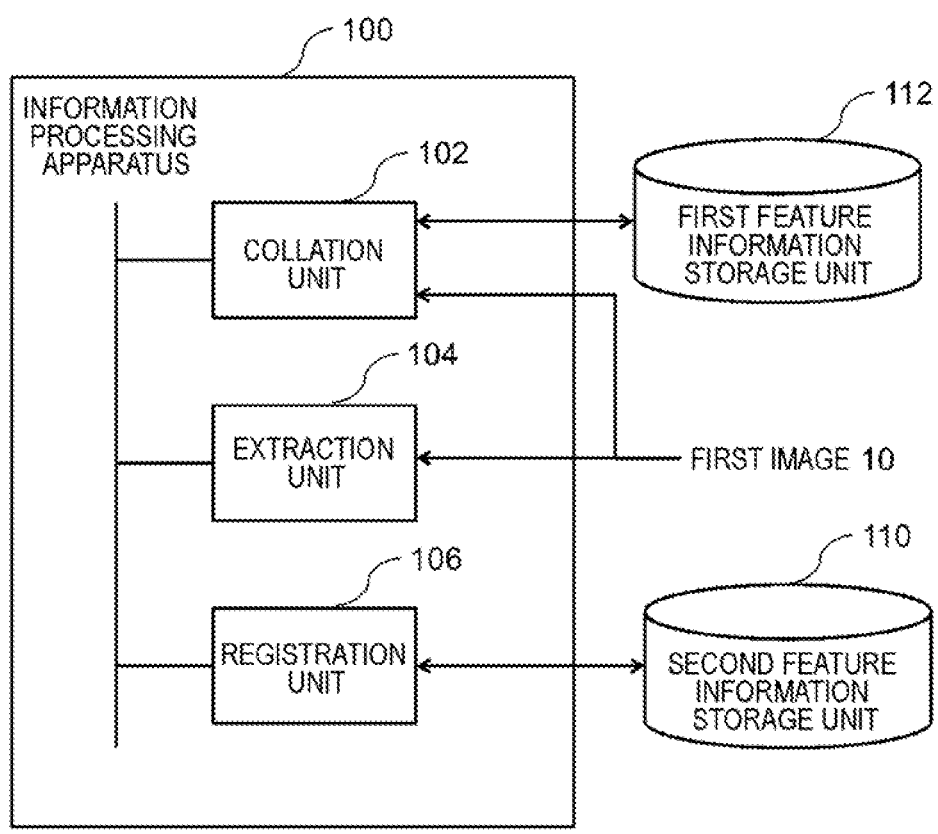
FIG. 3 is a functional block diagram illustrating a logical configuration of an information processing apparatus according to a first example embodiment.

FIG. 3 is a functional block diagram illustrating a logical configuration of the information processing apparatus 100 of the present example embodiment. The information processing apparatus 100 includes a collation unit 102, an extraction unit 104, and a registration unit 106. In the example illustrated in FIG. 3, the information processing apparatus 100 further includes a second feature information storage unit 110. The second feature information storage unit 110 may be integrated with a main body of the information processing apparatus 100, and may be separated therefrom. The second feature information storage unit 110 may have a database structure, and may have other data structures.

The collation unit 102 performs a collation process of collating first feature information indicating a feature of a retrieval target person with feature information of a person region extracted from a person included in the first image 10. Here, first feature information extracted from the second image 22 is feature information indicating a feature of a person region of a retrieval target person, and will also be hereinafter first feature information 14*a*. Feature information of a person region extracted from a person included in the retrieval target first image 10 will also be hereinafter referred to as first feature information 14*b*. In a case where a collation result in the collation unit 102 indicates a match, the extraction unit 104 extracts second feature information from a person included in the first image 10. The registration unit 106 stores the second feature information extracted from the person included in the first image 10 in the second feature information storage unit 110. In other words, the registration unit 106 registers the second feature information extracted from the person included in the first image 10 in the second feature information storage unit 110.

Specifically, the collation unit 102 acquires the first image 10 by reading the first image 10 from the medium 7 or by receiving the first image 10 from the camera 5. First, the collation unit 102 specifies a person region from the acquired first image 10, and performs a collation process with the first feature information 14*a* on the specified person region. Here, there may be a plurality of pieces of first feature information 14*a*.

Figure 4A:
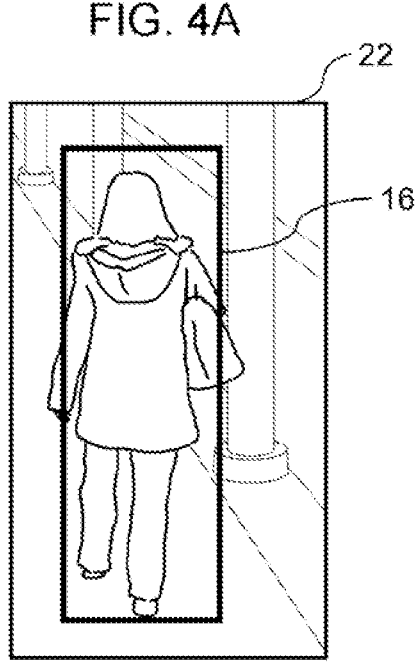
FIGS. 4A to 4C are diagrams illustrating for explaining a first image and a second image.

FIG. 4A illustrates an example of the second image 22. The second image 22 is an image in which a person is captured, but the person cannot be identified through face recognition or the like. The second image 22 is, for example, an image in which a person faces backward, and thus the face thereof is not captured, an image in which a face is not captured to the extent to which matching accuracy of a reference value or more can be obtained in a face recognition, or a low quality image on which face recognition cannot be performed. It should be noted that the image in which a person cannot be identified is not limited to a case where face recognition cannot be performed. The image may be an image in which a person cannot be identified in other recognition methods. The other recognition methods may be, for example, biological recognition, and is recognition using at least one of an iris, a pinna, a vein, and a fingerprint. With respect to a person captured in the second image 22, instead of identifying the person through a face recognition process or other recognition processes, the first feature information 14*a* may be extracted from a person region of the person. In other words, a face recognition process or other recognition processes are not necessarily required to be performed on the second image 22. In other words, the second image 22 may be an image on which identification of a person captured therein is not performed.

In a collation process, the collation unit 102 judges a person region of which the matching degree with the first feature information 14*a* is equal to or more than a reference, to be a region corresponding to the first feature information 14*a*. The extraction unit 104 specifies a person region of which the matching degree with the first feature information 14*a* is equal to or more than a reference in the first image 10, and further specifies a facial region of the person region.

The matching degree is a value indicating the degree of matching, and, in the present example embodiment, the matching degree is a numerical value of 0 to 1, is 1 in a case of complete matching, and is 0 in a case of complete mismatching.

Figure 4B:
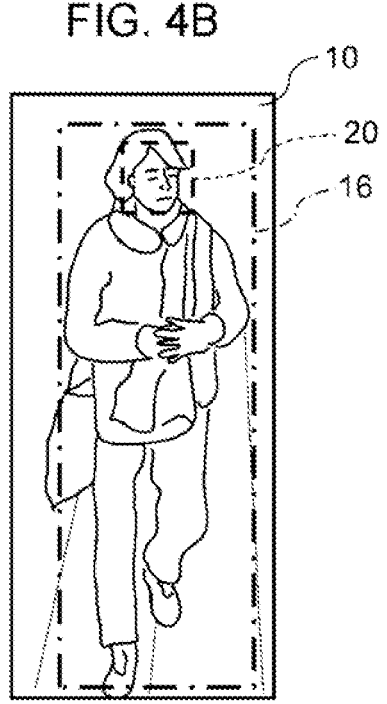
Figure 4C:

The extraction unit 104 extracts feature information of the specified facial region so as to generate second feature information, and the registration unit 106 stores the second feature information in the second feature information storage unit 110. As illustrated in FIGS. 4B and 4C, a person region 16 and a facial region 20 are specified in the first image 10. A person including the regions is a candidate of the retrieval target person.

The extraction unit 104 may extract pieces of the first feature information 14*a* of a plurality of retrieval target persons from person regions of persons included in a plurality of different second images 22, and the registration unit 106 may store a plurality of the pieces of first feature information 14*a* in a first feature information storage unit 112 in association with each other as information regarding an identical person. The collation unit 102 may perform a collation process by using the plurality of pieces of first feature information 14*a*.

The information processing apparatus 100 is not necessarily required to include the first feature information storage unit 112. The collation unit 102 may acquire the first feature information 14*a* by reading the first feature information 14*a* from the first feature information storage unit 112, or by receiving the first feature information 14*a* inputted from an external apparatus. The first feature information storage unit 112 may also be used as the second feature information storage unit 110. In this case, the information processing apparatus 100 uses the generated second feature information as the first feature information.

In the present example embodiment, the person region includes regions corresponding to a first portion and a second portion. The second portion is at least one region of, for example, a face, an iris, a pinna, a vein, and a fingerprint. Alternatively, the second portion may be a gait of a person instead of a region. The first portion may or not include the second portion. In the present example embodiment, the first portion is a region of the whole body of the person, and the second portion is a facial region. The first feature information (the first feature information 14*a* and the first feature information 14*b*) of the first portion is feature information indicating an appearance feature such as a size or a costume of a person. In the present specification, in some cases, the first feature information will be referred to as "person region feature information", and the second feature information will be referred to as "face information".

The first feature information (the first feature information 14*a* and the first feature information 14*b*) includes information indicating features such as a height, a shoulder width, a body part ratio, a garment (a shape, a color, a material, or the like), a hair style (also including a hair color), an ornament (a cap, spectacles, an accessory, or the like), and a belonging (a bag, an umbrella, or a stick). The person region feature information may include information such as likelihood of the feature information.

In the present example embodiment, the first feature information 14a of a retrieval target person is generated by using the second image 22 in which the retrieval target person is captured. The second image 22 may be an image captured by the camera 5, may be an image captured by other imaging means, and may be an image read by a scanner.

The information processing apparatus 100 further includes a first feature information generation unit (not illustrated). The first feature information generation unit generates the first feature information 14a by using the second image 22 in which a retrieval target person is captured, and stores the first feature information 14a in the first feature information storage unit 112.

Figure 5:
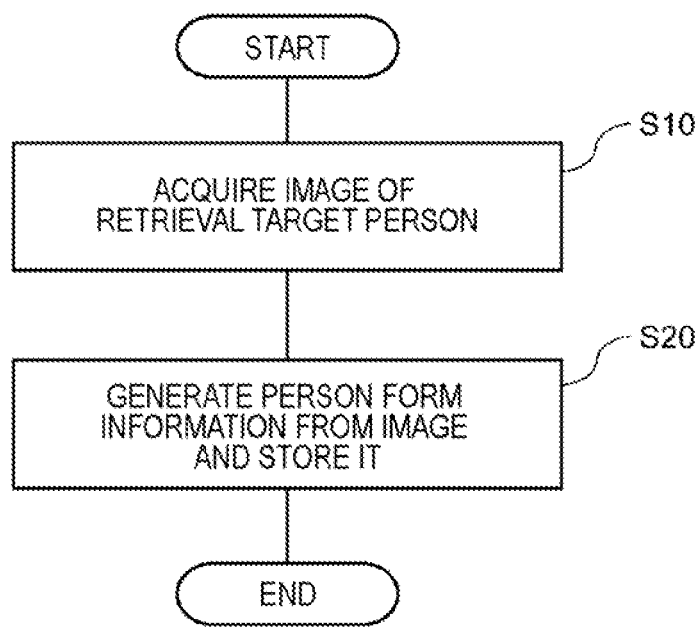
FIG. 5 is a flowchart illustrating an example of procedures of a process of the information processing apparatus generating first feature information.

FIG. 5 is a flowchart illustrating an example of procedures of a process of the information processing apparatus 100 generating the first feature information 14a. The first feature information generation unit acquires an image (second image 22) of a retrieval target person (step S10), generates the first feature information (person region feature information) by using the acquired image, and stores the second feature information in the first feature information storage unit 112 (step S20).

Figure 6A:
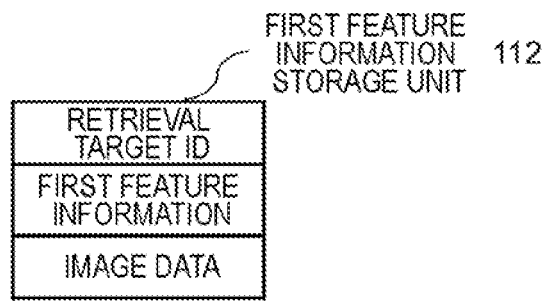
FIGS. 6A to 6C are diagrams illustrating examples of data structures of a first feature information storage unit and a second feature information storage unit.

FIG. 6A is a diagram illustrating an example of a data structure of the first feature information storage unit 112. A retrieval target ID for identifying a retrieval target person, the first feature information 14a of the person, and image data of an original image from which the first feature information 14a is acquired are stored in the first feature information storage unit 112 in association with each other. The first feature information storage unit 112 may store the entity of image data, and may store a path indicating a location where image data is preserved and a file name.

Figure 6B:
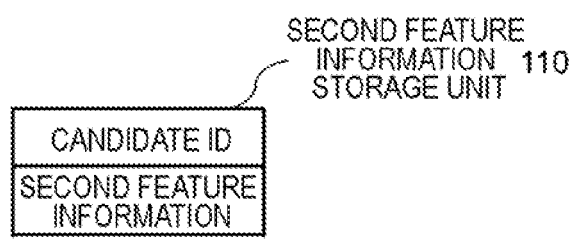
Figure 6C:
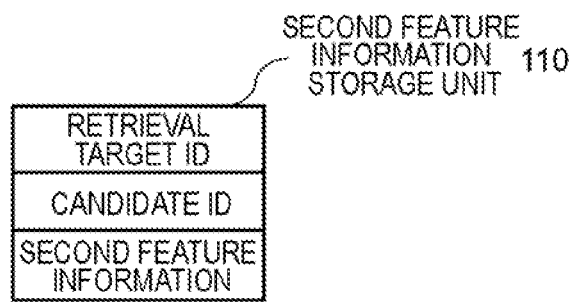

FIG. 6B is a diagram illustrating an example of a data structure of the second feature information storage unit 110. A candidate ID for identifying a candidate of a retrieval target person and the second feature information of the candidate are stored in association with each other in the second feature information storage unit 110. The second feature information storage unit 110 stores information regarding at least one candidate of a retrieval target person. In a case where there are a plurality of retrieval target persons, as illustrated in FIG. 6C, in the second feature information storage unit 110, a retrieval target ID which is a basis of the candidate may be associated with a candidate ID and the second feature information of the candidate.

Figure 7:
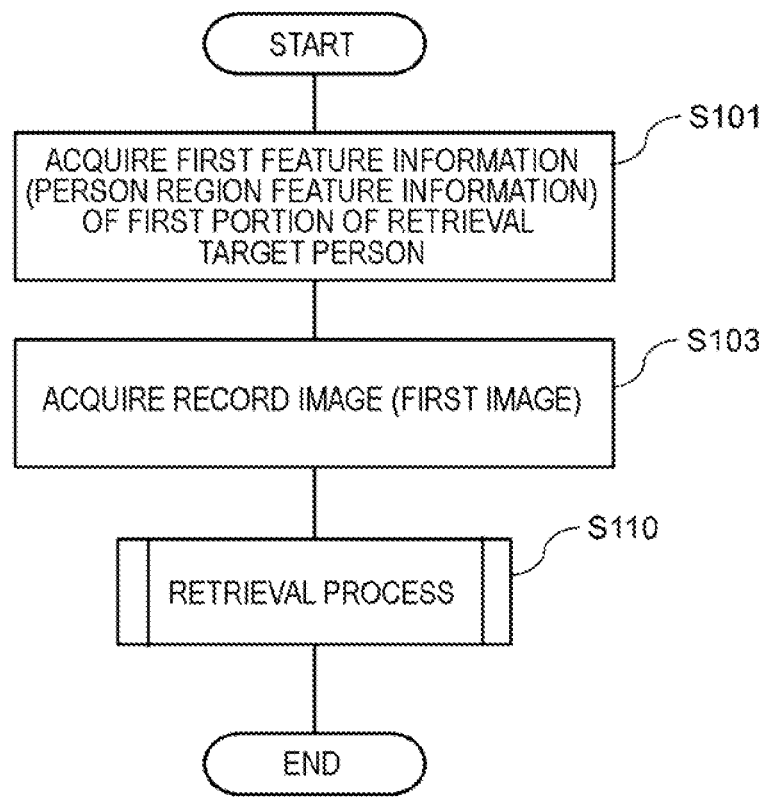
FIG. 7 is a flowchart illustrating an example of an operation of the information processing apparatus.
Figure 8:
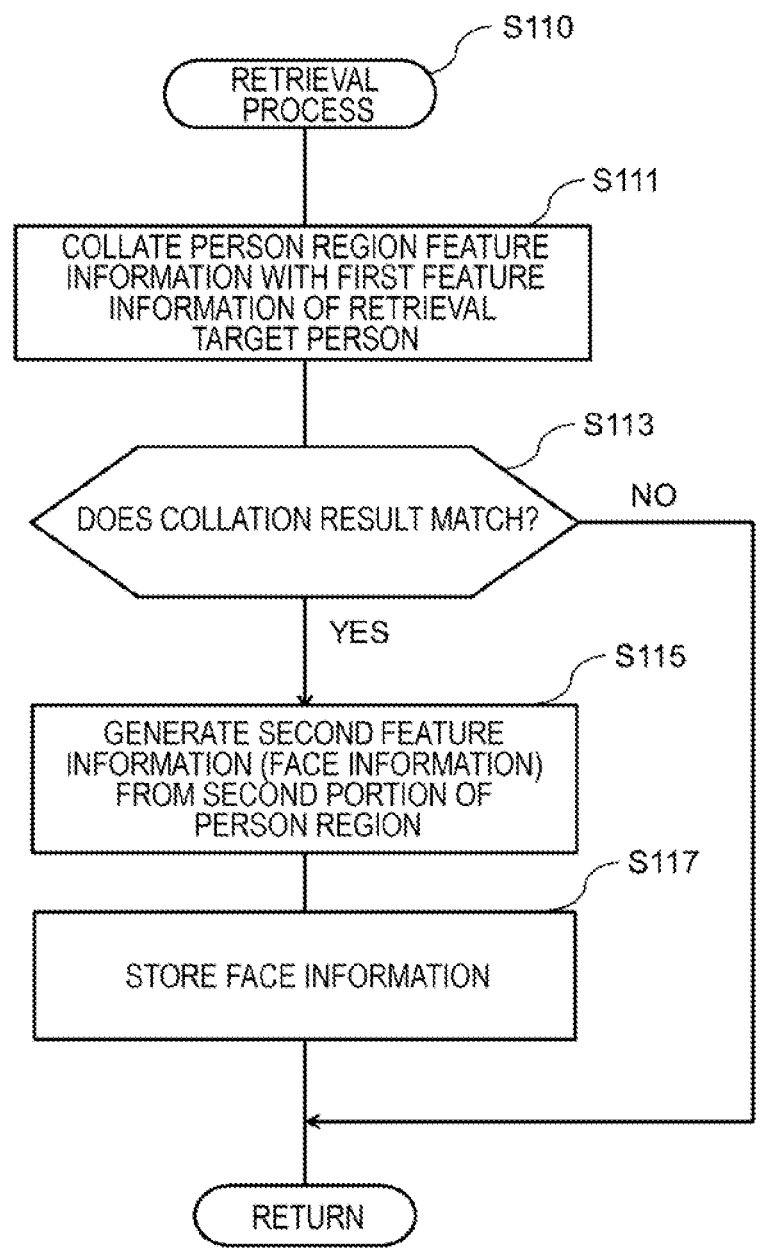
FIG. 8 is a flowchart illustrating details of a retrieval process in step S110 in FIG. 7.

FIG. 7 is a flowchart illustrating an example of an operation of the information processing apparatus 100. FIG. 8 is a flowchart illustrating details of a retrieval process in step S110 in FIG. 7.

First, the collation unit 102 acquires the first feature information 14a (person region feature information) of a retrieval target person (step S101). The collation unit 102 further acquires the first image 10 (step S103). The flow proceeds to the retrieval process in step S110 in FIG. 8.

As illustrated in FIG. 8, in the retrieval process in step S110, first, the collation unit 102 performs a collation process between the first feature information 14a of the retrieval target person and the first feature information 14b of a person region extracted from a person included in the first image 10 (step S111). In a case where a collation result between the first feature information 14a and the first feature information 14b indicates a match, that is, a region is found of which the matching degree with the first feature information 14a is equal to or more than a reference (YES in step S113), the extraction unit 104 generates the second feature information (face information) from the person included in the first image 10 (step S115). For example, the extraction unit 104 may specify a person region including the region, specify a facial region in the specified person region, and generate the second feature information (face information) by extracting feature information of the specified facial region. The registration unit 106 stores the generated face information in the second feature information storage unit 110 (step S117).

In the present example embodiment, in a case where the collation unit 102 finds a person matching person region feature information (first feature information 14a) of a retrieval target person from the first image 10, the extraction unit 104 generates feature information of a facial region of the person, and the registration unit 106 stores the feature information in the second feature information storage unit 110. The feature information of the facial region stored in the second feature information storage unit 110 is used for a person identification process in image processing. As mentioned above, according to the present example embodiment, a retrieval target person can be found from the first image 10 captured by the camera 5 by using person region feature information (first feature information 14a) which is obtained from an image in which the face of the retrieval target person is not captured, and face feature information of the found person can be extracted and stored.

Second Example Embodiment

Figure 9:
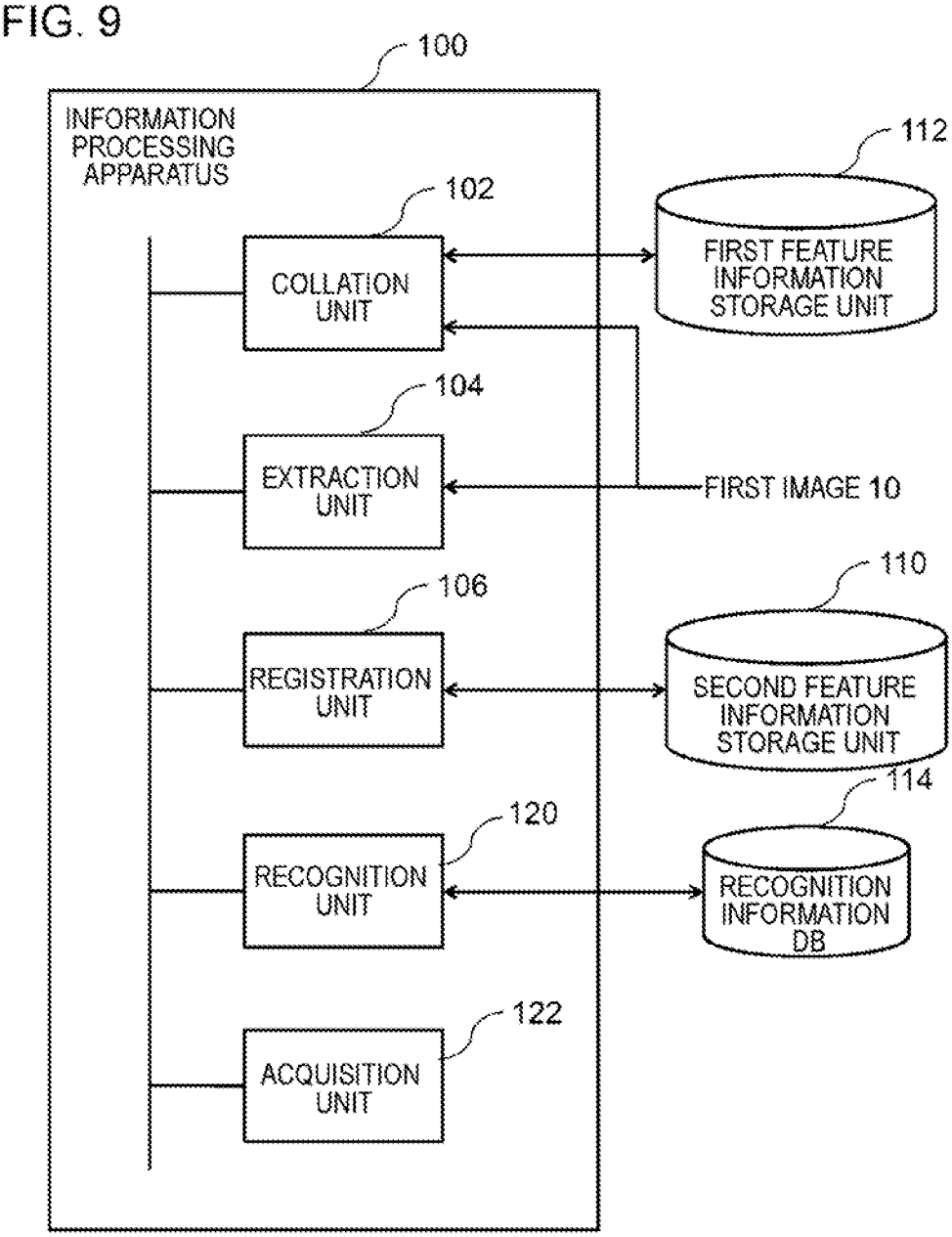
FIG. 9 is a functional block diagram illustrating a logical configuration of an information processing apparatus according to a second example embodiment.

FIG. 9 is a functional block diagram illustrating a logical configuration of an information processing apparatus 100 according to a second example embodiment. The information processing apparatus 100 of the present example embodiment is the same as that of the above-described example embodiment except that information on a candidate of a retrieval target person is acquired by collating second feature information stored in the second feature information storage unit 110 with preregistered face recognition information.

The information processing apparatus 100 in FIG. 9 further includes a recognition unit 120 and an acquisition unit 122 in addition to the configuration illustrated in FIG. 3. The recognition unit 120 performs a collation process on the second feature information stored in the second feature information storage unit 110 by using a recognition information database 114. The second feature information of a specific person is registered in association with information regarding the person in the recognition information database 114. The acquisition unit 122 acquires information regarding a person associated with the second feature information judged to have the matching degree of a reference or more, from the recognition information database 114.

Figure 10:
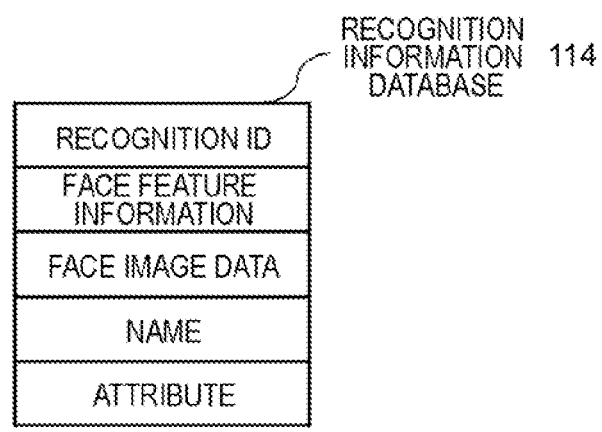
FIG. 10 is a diagram illustrating an example of a data structure of a recognition information database.

FIG. 10 is a diagram illustrating an example of a data structure of the recognition information database 114. A recognition ID for identifying a specific person (hereinafter, referred to as a registered person) of which recognition information is registered, face feature information (second feature information) indicating a feature of a face of the registered person, face image data of the registered person, the name of the registered person, attribute information of the registered person are registered in association with each other in the recognition information database 114.

The entity of the face image data may be registered in the recognition information database 114, and a path indicating a location where the face image data is stored and a file name may be registered. As will be described later, the face image data is used for screen display, and an operator may view a face picture displayed on a screen along a name and attribute information.

In the example illustrated in FIG. 9, the recognition information database 114 is a part of the information processing apparatus 100. The recognition information database 114 may be integrated with a main body of the information processing apparatus 100, and may be separated therefrom. The recognition information database 114 may be included in the same apparatus as that of second feature information storage unit 110, and may be included in different apparatuses. The recognition information database 114 has a database structure, but may have other data structures.

The collation unit 102 may have the function of the recognition unit 120 of the present example embodiment.

The information processing apparatus 100 may include an output processing unit (not illustrated) which reads identification information (recognition ID or a name) corresponding to face feature information stored in the recognition information database 114, and performs a process of outputting the identification information from an output unit, in a case where a recognition result in the recognition unit 120 indicates a match. An output process will be described later in detail.

Figure 11:
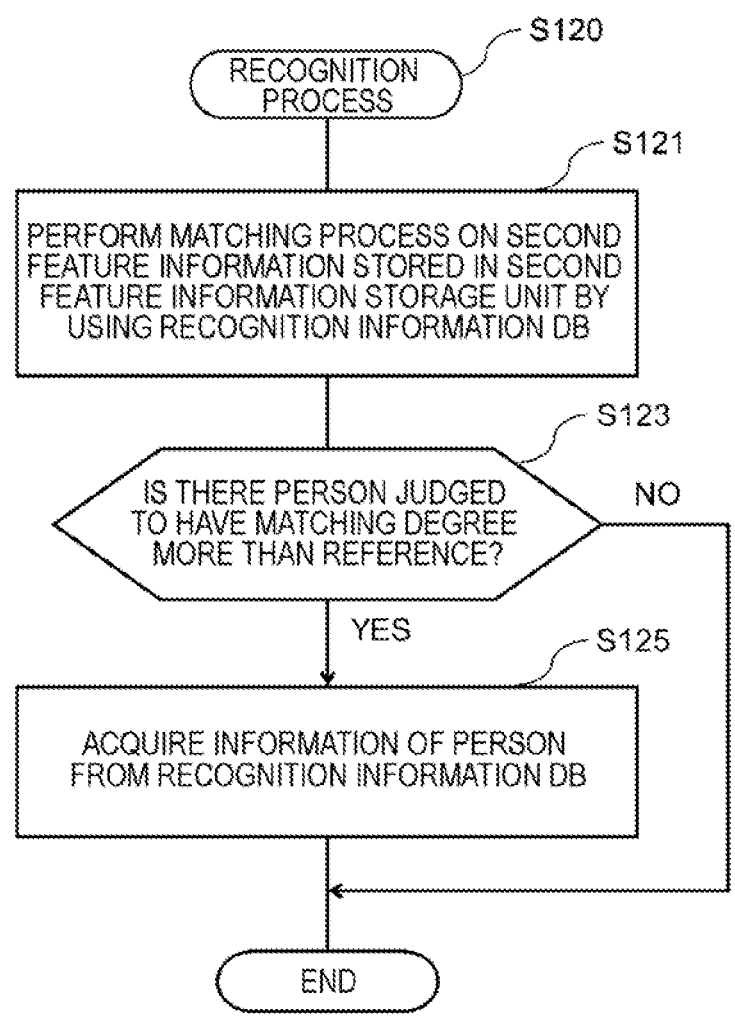
FIG. 11 is a flowchart illustrating an example of procedures of a recognition process in the information processing apparatus.

FIG. 11 is a flowchart illustrating an example of procedures of a recognition process in the information processing apparatus 100 of the present example embodiment.

First, the recognition unit 120 performs a collation process on the second feature information stored in the second feature information storage unit 110 by using the recognition information database 114 (step S121). In a case where there is a person judged to have the matching degree of a reference or more through the collation process (YES in step S123), the recognition unit 120 acquires information (a name or the like) regarding the person from the recognition information database 114 (step S125).

In the present example embodiment, the registration unit 106 of the information processing apparatus 100 stores a region corresponding to at least the first feature information 14a in the first image 10, in the second feature information storage unit 110 in association with the second feature information.

Figure 12:
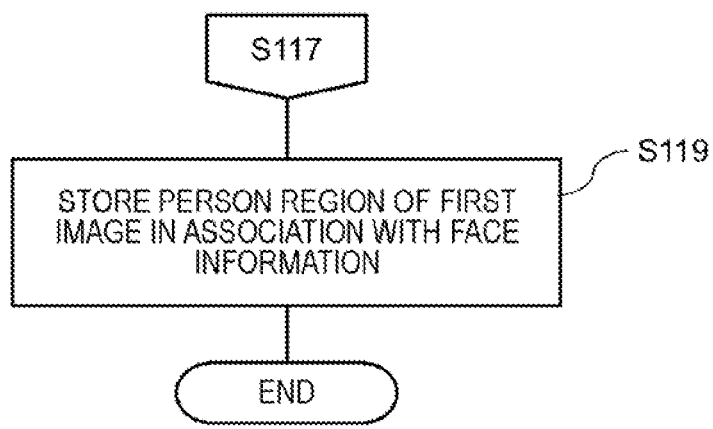
FIG. 12 is a flowchart illustrating another example of an operation of the information processing apparatus.

For example, as illustrated in FIG. 12, after step S117 in the flowchart of FIG. 8, the registration unit 106 may store image data of a person region in the first image 10, in the second feature information storage unit 110 in association with the second feature information (face information) (step S119).

Figure 13:
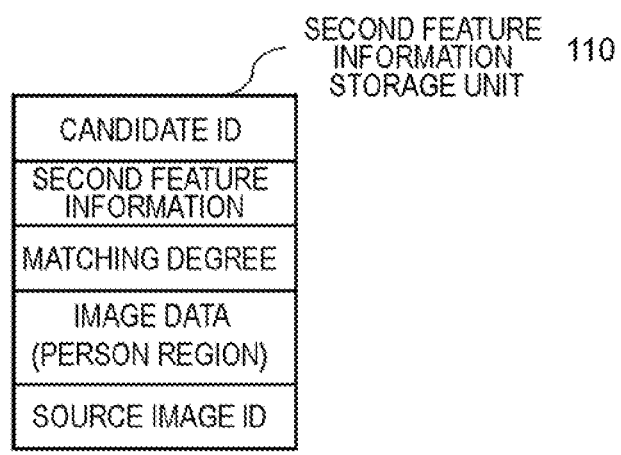
FIG. 13 is a diagram illustrating an example of a data structure of a second feature information storage unit.

FIG. 13 is a diagram illustrating an example of a data structure of the second feature information storage unit 110 of the present example embodiment. In the present example embodiment, in addition to the information described in FIG. 6B, information regarding the matching degree calculated in the collation process in step S121 in FIG. 11, image data of the person region, and an image ID (in FIG. 13, illustrated as an original image ID) for identifying the first image 10 from which the person region is acquired may be stored in association with each other in the second feature information storage unit 110.

Due to association with the original image ID, the information processing apparatus 100 may acquire a video ID from the first image 10 exemplified in FIG. 4B, and may further acquire information such as an imaging location from the second image 22 exemplified in FIG. 4A, in association with the second feature information. The information processing apparatus 100 may store imaging conditions such as an imaging location, an imaging direction, and an imaging time of the camera 5 in association with the second feature information in the second feature information storage unit 110.

As described above, in the present example embodiment, the recognition unit 120 performs a collation process with face information registered in the recognition information database 114 on face information stored in the second feature information storage unit 110, and thus the acquisition unit 122 can acquire information regarding a similar person. As mentioned above, according to the present example embodiment, it is possible to achieve the same effect as that in the above-described example embodiment, and also to acquire information regarding a similar person from the first image 10 captured by the camera 5 by performing a face recognition process on a candidate resembling a retrieval target person by using person region feature information.

Third Example Embodiment

Figure 14:
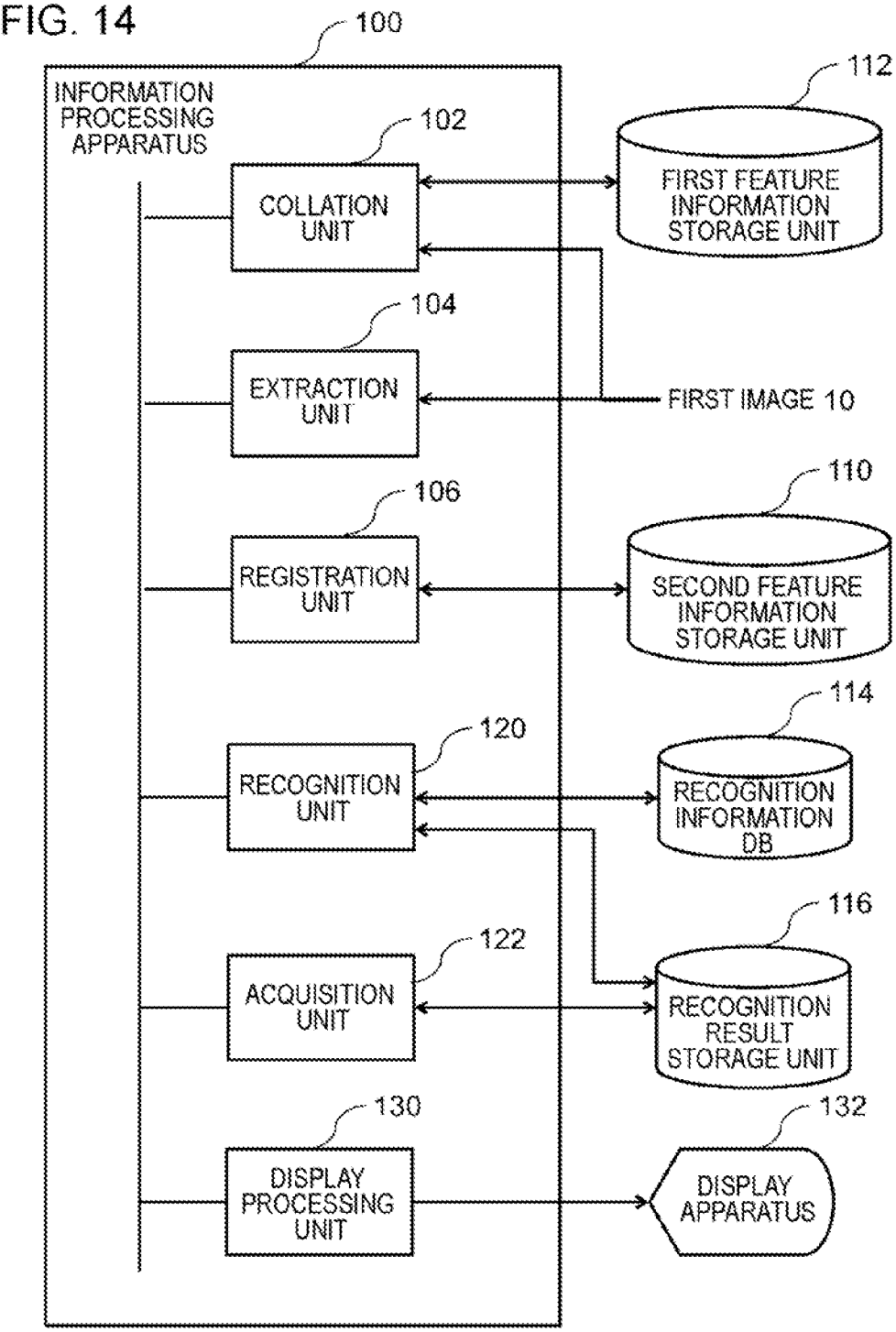
FIG. 14 is a functional block diagram illustrating a logical configuration of an information processing apparatus according to a third example embodiment.

FIG. 14 is a functional block diagram illustrating a logical configuration of an information processing apparatus 100 according to a third example embodiment. The information processing apparatus 100 of the present example embodiment is the same as that of the second example embodiment except for a configuration in which information regarding a detected candidate is displayed. The information processing apparatus 100 further includes a display processing unit 130 in addition to the configuration in FIG. 9. The display processing unit 130 displays various pieces of information on a display apparatus 132 such as a liquid crystal display or an organic electroluminescence (EL) display connected to the information processing apparatus 100.

In the present example embodiment, the acquisition unit 122 acquires a plurality of candidate person region images and pieces of information (names or attributes) from the recognition information database 114. The display processing unit 130 displays each candidate person region image in an image display section 214, and displays information regarding at least one person who is detected as a candidate as a result of a face recognition process in a candidate display section 222 for each candidate. Specifically, the display processing unit 130 displays at least two of a retrieval target display section 202, a retrieval result display section 210, and a recognition result display section 220 on an identical screen.

Figure 15:
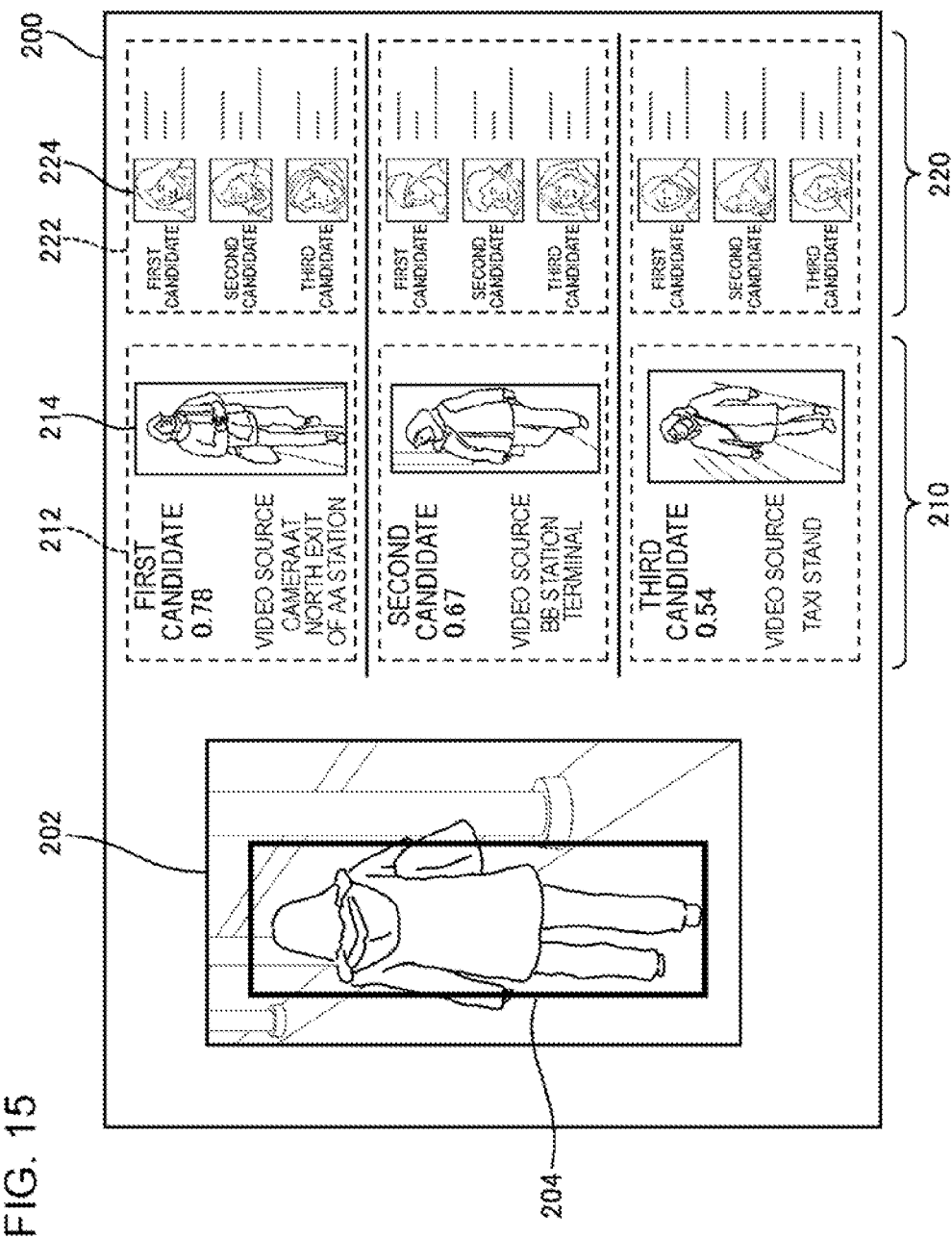
FIG. 15 is a diagram illustrating an example of a result list screen displayed by the information processing apparatus.

FIG. 15 is a diagram illustrating an example of a result list screen 200 displayed by the information processing apparatus 100 of the present example embodiment. In the example illustrated in FIG. 15, the retrieval target display section 202, the retrieval result display section 210, and the recognition result display section 220 are displayed on the identical result list screen 200. It should be noted that an example of displaying at least two of the retrieval target display section 202, the retrieval result display section 210, and the recognition result display section 220 on an identical screen will be described later.

In the present example embodiment, the acquisition unit 122 acquires at least some information displayed by the display processing unit 130. Such some information includes, for example, the second image 22 from which the first feature information 14a (person region feature information) indicating a feature regarding a region other than the face of a retrieval target person, the first image 10 (hereinafter, referred to as a candidate person region image in some cases) in which a collation result with the first feature information 14a (person region feature information) indicates a match, and a facial region is detected, and result information. The result information indicates a result of collating face information stored in the recognition information database 114 with second feature information extracted from a facial region, and is generated by the recognition unit 120. Specifically, the result information is data stored in a recognition result storage unit 116.

The collation result with the first feature information 14a (person region feature information) indicating a match is to include, for example, a region in which the matching degree with the first feature information 14a (person region feature information) is equal to or more than a reference.

The second image 22 in which a retrieval target person is captured is displayed in the retrieval target display section 202. The second image 22 displayed in the retrieval target display section 202 is a part of the second image 22 including at least a person region of the retrieval target person, and may be, for example, an image generated by cutting the second image into a rectangular shape including the person region of the retrieval target person. The retrieval result display section 210 includes at least one candidate display section 212. Each candidate display section 212 includes the image display section 214. A candidate person region image of the candidate is displayed in the image display section 214 along with an imaging condition (for example, an imaging location) of the image, and the matching degree with the second image 22 displayed in the retrieval target display section 202. The candidate person region image is at least a part of the first image 10, and may be, for example, an image generated by cutting the first image into a rectangular shape including a person region matching in collation. A result of face recognition is displayed in the recognition result display section 220, and the candidate display section 222 is also displayed for each candidate displayed in the candidate display section 212. The candidate display section 222 includes an image display section 224. A face image of a person of which the matching degree with the candidate person region image is high is displayed in the image display section 224. Information displayed in the image display section 224 is included in the above-described result information.

In the example illustrated in FIG. 15, the pieces of information regarding a plurality of candidates are displayed in a descending order of the matching degree with the first feature information 14a. Here, the pieces of information regarding a plurality of candidates are displayed in a descending order of the matching degree with the second feature information in the candidate display section 222. The number of candidates displayed in the retrieval result display section 210 and the recognition result display section 220 may be settable on a setting menu (not illustrated) or the like. All candidates of which the matching degree is equal to or more than a predetermined reference value may be displayed on a list screen or through scrolling. In this case, the predetermined reference value may be settable on a setting menu.

As illustrated in FIG. 14, the information processing apparatus 100 further includes the recognition result storage unit 116. The recognition result storage unit 116 may be integrated with a main body of the information processing apparatus 100, and may be separated therefrom. The recognition result storage unit 116 may be included in the same apparatus as that of second feature information storage unit 110 and the recognition information database 114, and may be included in different apparatuses. The recognition result storage unit 116 may have a database structure.

Figure 16:
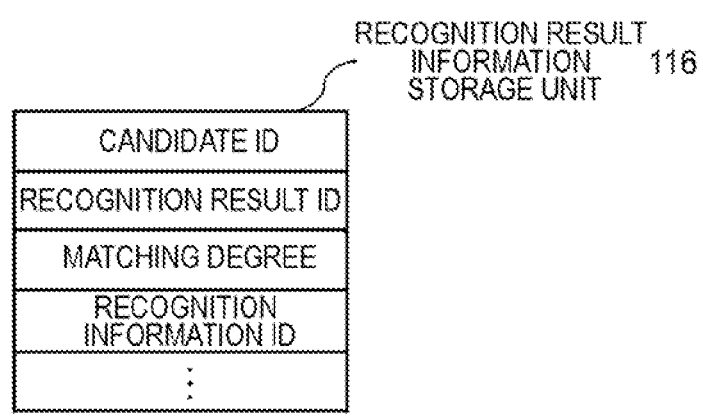
FIG. 16 is a diagram illustrating an example of a data structure of a recognition result storage unit.

FIG. 16 is a diagram illustrating an example of a data structure of the recognition result storage unit 116 of the present example embodiment. A candidate ID, a recognition result ID for identifying result information, the matching degree of face recognition, and recognition information ID indicating source recognition information from which the result information is obtained are registered in the recognition result storage unit 116 in association with each other for each candidate.

Figure 17:
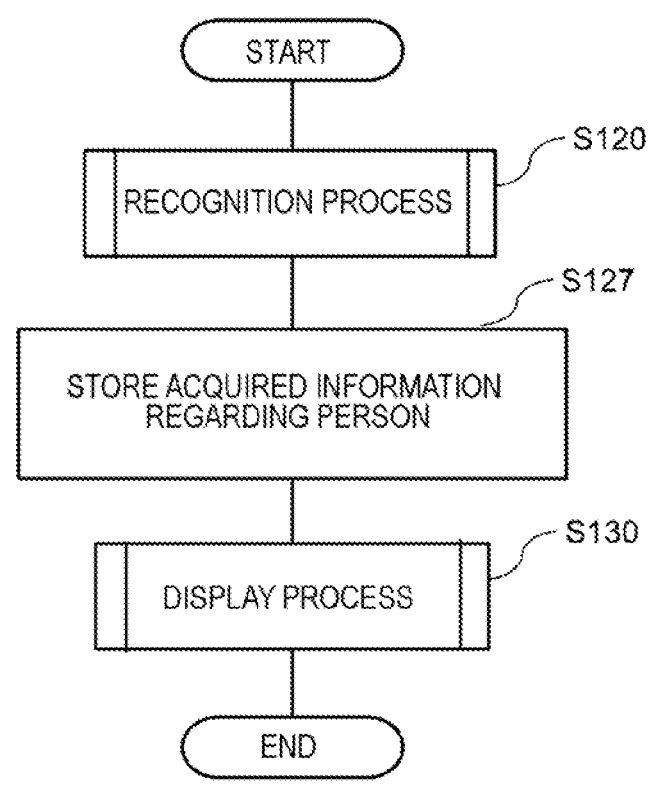
FIG. 17 is a flowchart illustrating an example of an operation of the information processing apparatus.

FIG. 17 is a flowchart illustrating an example of an operation of the information processing apparatus 100 of the present example embodiment. First, the recognition process (step S120) described with reference to FIG. 11 is performed, and then the acquisition unit 122 stores the information regarding the person acquired in the recognition process in the recognition result storage unit 116 as result information (step S127). The display processing unit 130 displays the acquired information (the result list screen 200 in FIG. 15) on the display apparatus 132 (step S130).

Figure 18:
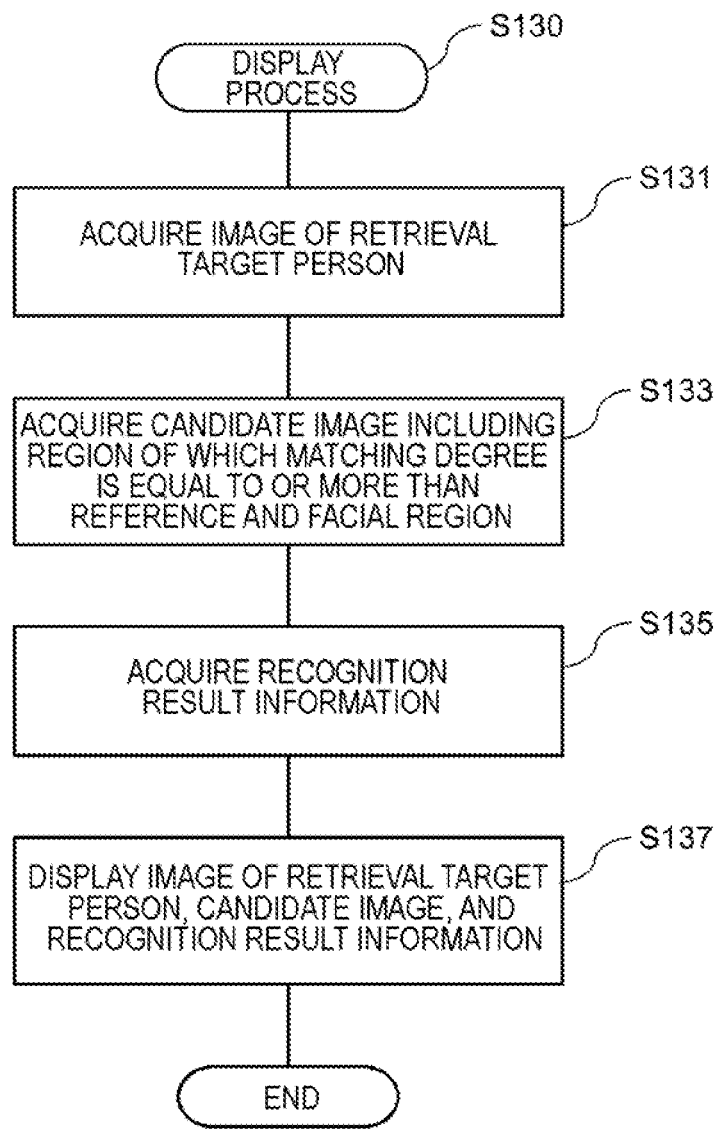
FIG. 18 is a flowchart illustrating an example of detailed procedures of a display process in step S130 in FIG. 17.

FIG. 18 is a flowchart illustrating an example of detailed procedures of the display process in step S130 in FIG. 17. First, the acquisition unit 122 acquires an image (second image 22) of the retrieval target person from the first feature information storage unit 112 (step S131). The acquisition unit 122 acquires a candidate image (first image 10) including a region of which the matching degree is equal to or more than a reference and a facial region from the second feature information storage unit 110 (step S133). The acquisition unit 122 acquires result information from the recognition result storage unit 116 (step S135).

The display processing unit 130 displays the second image 22 acquired in step S131 in the retrieval target display section 202 of the result list screen 200, displays the candidate image acquired in step S133 in the image display section 214 of the retrieval result display section 210, and displays the result information acquired in step S135 in the recognition result display section 220 (step S137).

Figure 19:
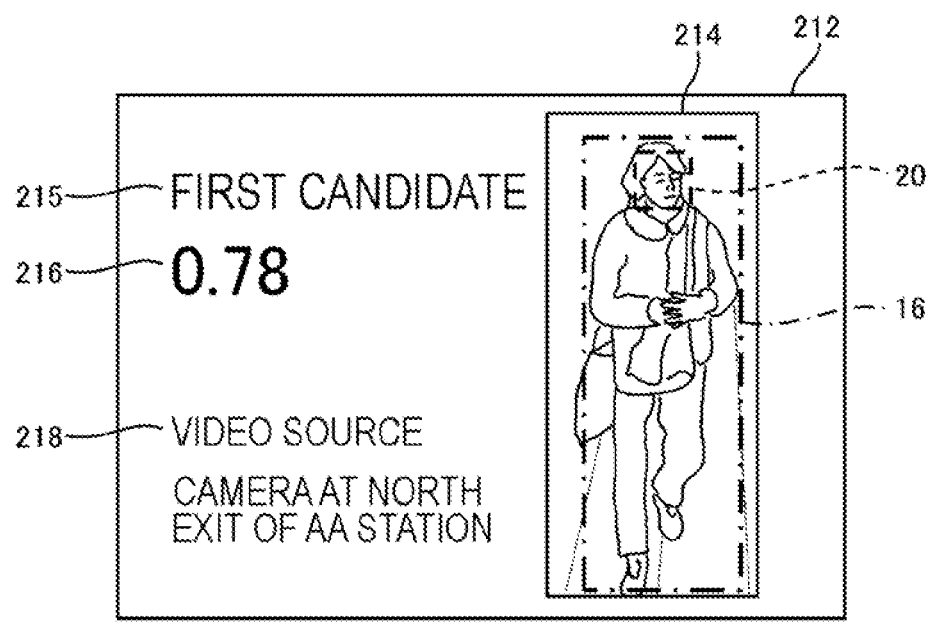
FIG. 19 is a diagram illustrating details of a display example in a candidate display section in FIG. 15.

FIG. 19 is a diagram illustrating details of a display example in the candidate display section 212 in FIG. 15. The candidate display section 212 includes the image display section 214, a candidate ranking display section 215, a matching degree display section 216, and an imaging location display section 218. An image including the person region 16 of a candidate is displayed in the image display section 214, and a frame surrounding the person region 16 and a frame surrounding the facial region 20 may be separately displayed.

Figure 20:
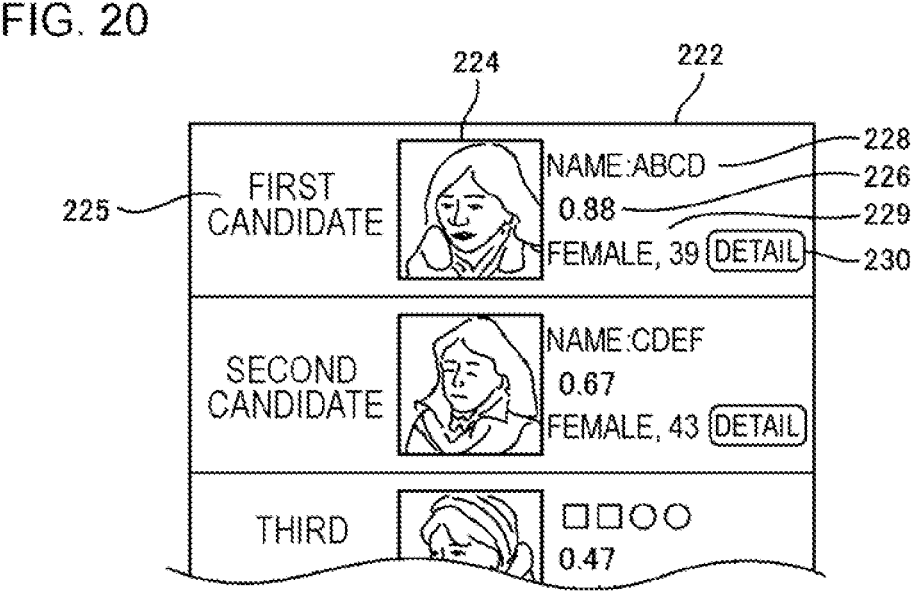
FIG. 20 is a diagram illustrating details of a display example in a candidate display section in FIG. 15.

FIG. 20 is a diagram illustrating details of a display example in the candidate display section 222 in FIG. 15. The candidate display section 222 includes the image display section 224, a candidate ranking display section 225, a matching degree display section 226, a name display section 228, a candidate attribute information display section 229, and a detail display button 230. A face image of a person detected through a face recognition process is displayed in the image display section 224. The name of the person is displayed in the name display section 228. At least one of the face image and identification information of the person detected through the face recognition process is displayed in the candidate display section 222. It should be noted that the identification information of the person may be identification information (the recognition ID in FIG. 10) in the recognition information database 114, and may be at least one of a name and an attribute.

Figure 21:
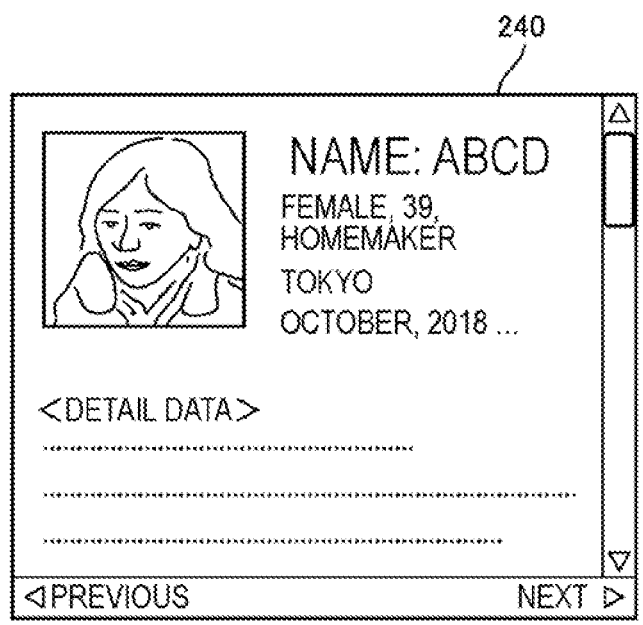
FIG. 21 is a diagram illustrating an example of a detailed information window.

Attribute information of the person detected through the face recognition process, for example, the sex and the age thereof are displayed in the candidate attribute information display section 229. A detail display button 230 is an operation button used to display new attribute information of the person. In a case where pressing of the detail display button 230 is received, a detailed information window 240 in FIG. 21 is displayed. Detailed information displayed in the detailed information window 240 may be registered in the recognition information database 114, and may be stored in another storage apparatus in association with a recognition ID. As part of result information, information for reaching the detailed information is stored in the recognition result storage unit 116.

As described above, in the present example embodiment, the display processing unit 130 displays, on the identical result list screen 200, an image (second image 22) of a retrieval target person, an image of a person region of a candidate detected through a collation process with the first feature information 14a (person region feature information) in the first image 10 captured by the camera 5, and an image and information of a candidate detected through a collation process on a facial region included in the person region using the recognition information database 114.

As mentioned above, according to the present example embodiment, an image of a candidate can be detected in the first image 10 captured by the camera 5 and be displayed on the basis of an image (second image 22) of a retrieval target person of which a face is not captured, and, with respect to a facial region in the image of the candidate, a face image and attribute information of a person registered in the recognition information database 114 can be viewed on the identical result list screen 200.

Fourth Example Embodiment

In the above-described example embodiment, the configuration has been described in which the retrieval target display section 202, the retrieval result display section 210, and the recognition result display section 220 are displayed on the result list screen 200 together. The information processing apparatus 100 of the present example embodiment displays the retrieval target display section 202, displays the candidate display section 212 in which an image of at least one candidate is displayed or the candidates may be displayed in a switching manner in a ranking order and further displays the display section 222 in which a face recognition result for a selected candidate is indicated.

Figure 22:
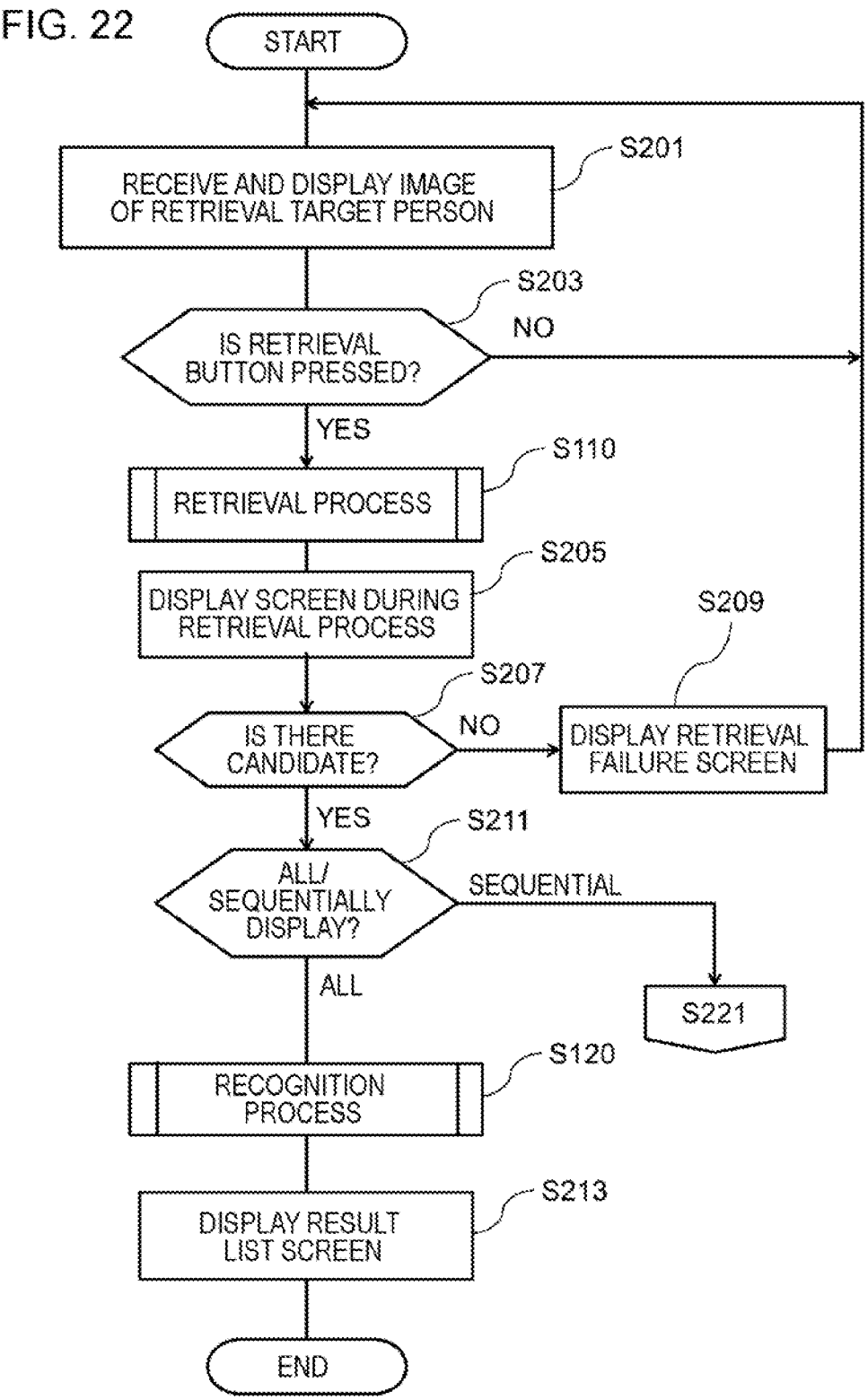
FIG. 22 is a diagram illustrating an example of procedures of a display process in the information processing apparatus.
Figure 23:
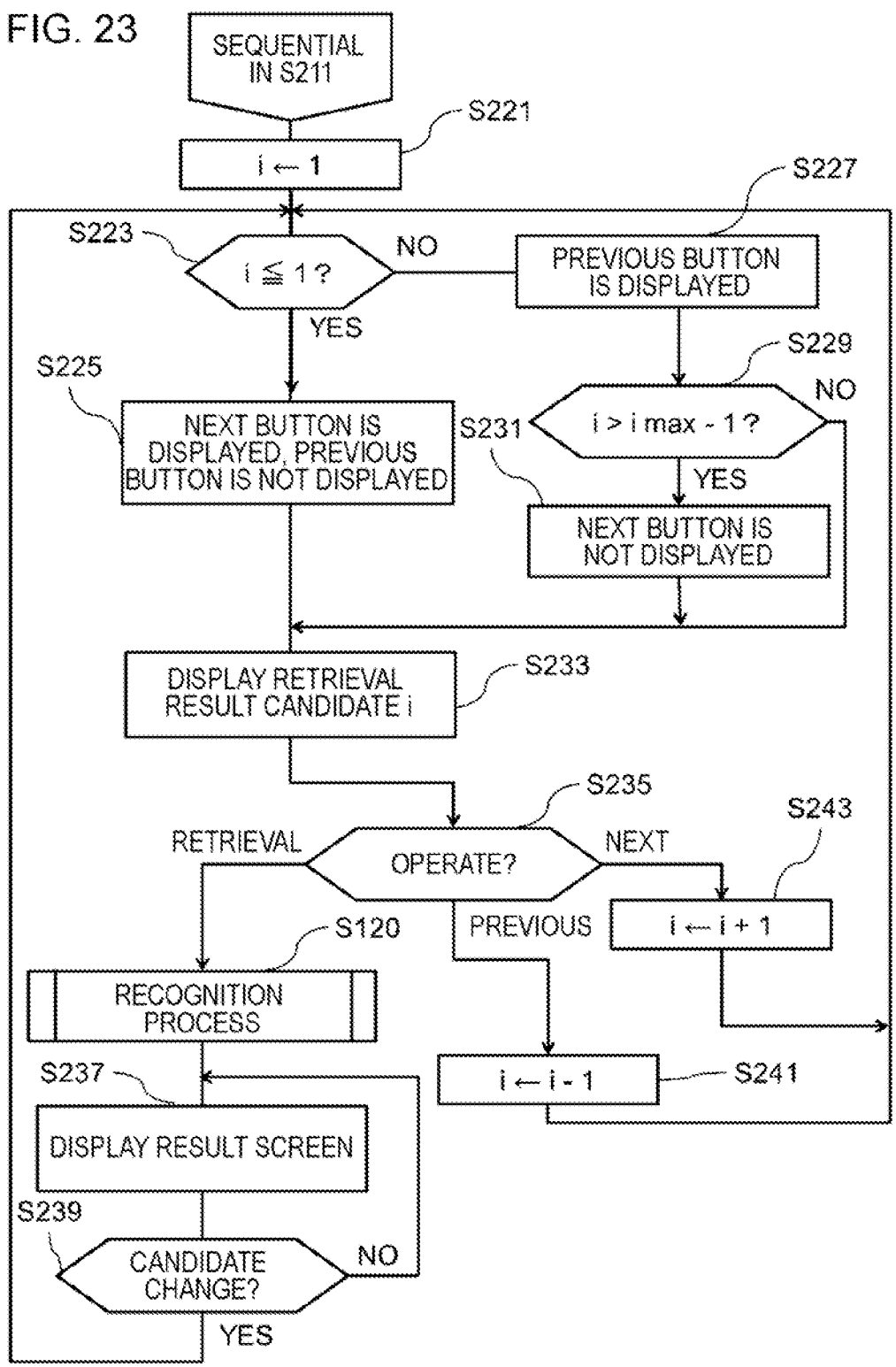
FIG. 23 is a diagram illustrating an example of procedures of a display process in the information processing apparatus.
Figure 24:
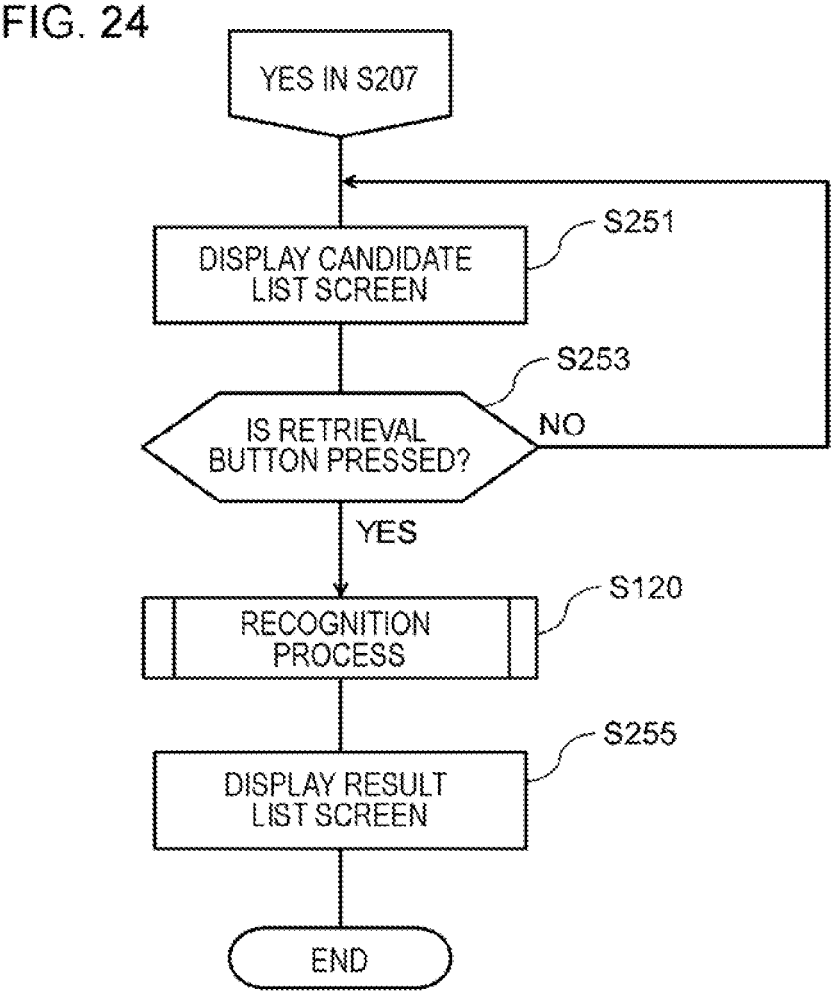
FIG. 24 is a diagram illustrating an example of procedures of a display process in the information processing apparatus.

FIGS. 22 to 24 are diagrams illustrating examples of procedures of a display process in the information processing apparatus 100 of the present example embodiment. FIGS. 25A to 25F are diagrams for explaining changes of a display screen. Hereinafter, a description will be made of a display process in the information processing apparatus 100 with reference to the drawings.

First, the display processing unit 130 receives specification for a retrieval target person in the second image 22, and displays the retrieval target person in the retrieval target display section 202 of a screen 300 in FIG. 25A (step S201). For example, in a case where a plurality of persons are included in the second image 22, a frame for specifying the person region 16 of the target person may be operated on the second image 22 by an operator to display the target person. The screen 300 further includes a retrieval button 302 and a cancel button 304.

Figure 25:
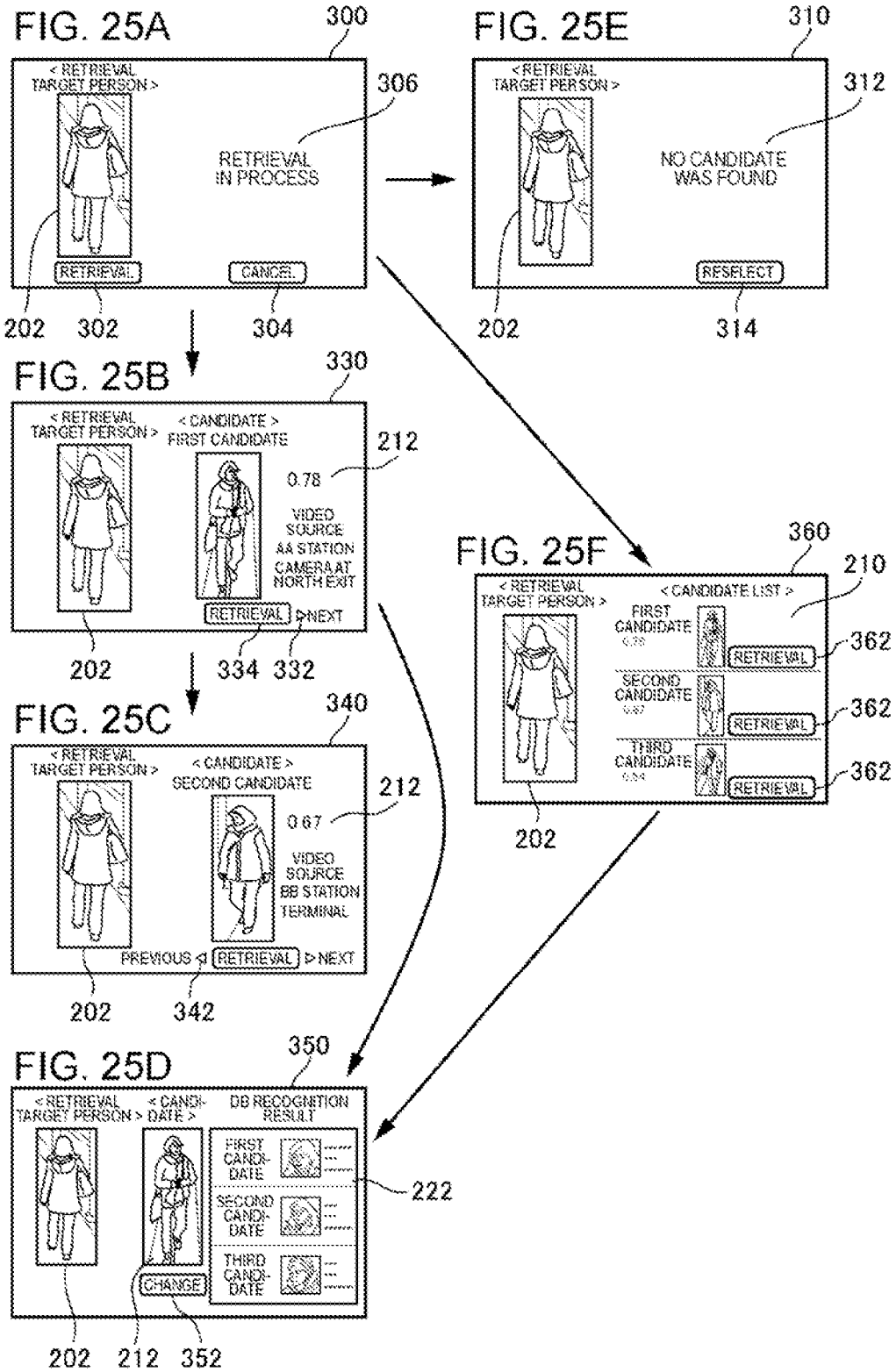
FIGS. 25A to 25F are diagrams for explaining changes of a display screen.

In the example illustrated in FIG. 25, there is a single retrieval target person, but, in a case where a collation process is performed by using the first feature information 14a of a plurality of retrieval target persons captured in a plurality of second images 22, a plurality of images of the plurality of retrieval target persons may be displayed in the retrieval target display section 202. At least one candidate display section 212 may be displayed for each retrieval target person, and a plurality of pieces of information regarding a plurality of candidates obtained as a result of a collation process using the first feature information 14a of a plurality of retrieval target persons may be displayed in the candidate display section 212.

In a case where pressing of the retrieval button 302 is received (YES in step S203), the information processing apparatus 100 performs the retrieval process described in FIG. 8 (step S110). A message 306 indicating that retrieval is in progress is displayed during the retrieval process (step S205). In a case where pressing of the cancel button 304 is received during the retrieval process, the information processing apparatus 100 stops the retrieval process, and returns to step S201 (not illustrated).

In a case where a candidate is not found as a result of the retrieval process (NO in step S207), a screen 310 in FIG. 25E is displayed. The screen 310 includes a message 312 indicating that a candidate is not found. The screen 310 may include a re-retrieval button 314. In a case where pressing of the re-retrieval button 314 is received, the flow may return to step S201, and a message prompting re-selection of the second image 22 of a retrieval target person may be displayed such that re-selection is received (not illustrated).

In the present example embodiment, it is assumed that a candidate display method is set in advance on a setting menu (not illustrated) or the like. On the setting menu, a method in which detected candidates are displayed one by one or a method in which detected candidate are all displayed (by a predetermined number of persons (for example, by the three highest-ranking persons)) may be selected. In a case where at least one candidate is found (YES in step S207), the information processing apparatus 100 changes a candidate display method according to the setting (step S211). For example, in a case where all candidates (three highest-ranking persons in this example) are selected, the flow proceeds to the recognition process in step S120, and a face recognition process is performed on a facial region of each candidate. The result list screen 200 (FIG. 15) indicating a result of the face recognition process is displayed (step S213).

In a case where the setting of sequentially displaying candidates one by one is selected (sequential in step S211), the information processing apparatus 100 proceeds to step S221 (FIG. 23). First, 1 is set in a counter i (step S221). In a case where i is equal to or less than 1, as illustrated in FIG. 25B, a next button 332 for displaying the next candidate is displayed on a screen 330, and a previous button for displaying the previous candidate is not displayed (step S225). The retrieval target display section 202 and the candidate display section 212 of a first candidate are displayed on the screen 330 (step S233). A retrieval button 334 for receiving a face recognition process for the candidate is displayed on the screen 330.

A process is changed depending on the type of pressed operation button on the screen 330 (step S235). In a case where pressing of the next button 332 is received, i is incremented to 2 (step S243), and the flow returns to step S223. Since i is 2, a result in step S223 indicates NO, and a previous button 342 is further displayed on a screen 340 (step S227). Here, assuming that a maximum value of the number of displayed candidates is 3, i>the maximum value imax−1 (that is, 2) is not established (NO in step S229), the flow proceeds to step S233, and the candidate display section 212 of a second candidate is displayed on a screen 340 in FIG. 25C (step S233).

In a case where the previous button 342 is pressed (previous in step S235), i is decremented to 1 (step S241), and the flow returns to step S223. Since i<1 is established, the flow proceeds to step S225, the next button 332 is displayed, and the previous button 342 is not displayed. The candidate display section 212 of the first candidate is displayed on the screen 330 (FIG. 25B) (step S235).

In a case where the retrieval button 334 is pressed on the screen 330 in FIG. 25B (retrieval in step S235), a face recognition process is performed on a facial region of the first candidate (step S120). In a case where result information is acquired, a result screen 350 in FIG. 25D is displayed (step S237). The retrieval target display section 202, the candidate display section 212, and the candidate display section 222 are displayed on the result screen 350, and a change button 352 for performing a face recognition process on other candidates may be further displayed.

In a case where the change button 352 is pressed (YES in step S239), the flow returns to step S223. Here, since i is 1, the screen 330 in FIG. 25B is displayed. In a case where the next button 332 is selected, the second candidate is displayed (step S233), and, in a case where the retrieval button 334 is selected (retrieval in step S235), a face recognition process is performed on the second candidate (step S120).

As another example, candidates may be displayed by a predetermined number of persons (for example, by the three highest-ranking persons) instead of one by one, and a person on which a face recognition process is to be performed may be selected from among the candidates. FIG. 24 is a flowchart illustrating an example of procedures of a display process. In a case where a candidate is detected in step S207 in FIG. 22 (YES in step S207), a screen 360 in FIG. 25F is displayed (step S251). The recognition result display section 220, and the retrieval result display section 210 including the candidate display sections 212 of a plurality of candidates (three persons in this example) are displayed on the screen 360. A retrieval button 362 for receiving selection of a candidate on which a face recognition process is to be performed is displayed in the candidate display section 212.

In a case where the retrieval button 362 is pressed (YES in step S253), the recognition unit 120 performs a face recognition process on the selected candidate (step S120). A result of the face recognition process is displayed on the screen 350 in FIG. 25D. On the screen 350, an image of the candidate selected as a target of the face recognition process is displayed in the candidate display section 212.

As described above, in the present example embodiment, the display processing unit 130 can display the screen 320 or the screen 360 including the retrieval target display section 202 and the retrieval result display section 210. Since, on the screen 320 or the screen 360, an operator can select a candidate on which a face recognition process is to be performed, and can perform the face recognition process, the face recognition process can be omitted on a clearly dissimilar person, and thus efficiency is improved. A display content can be changed depending on a size or the like of a display, and thus easily viewable screen display is possible.

Figure 26:
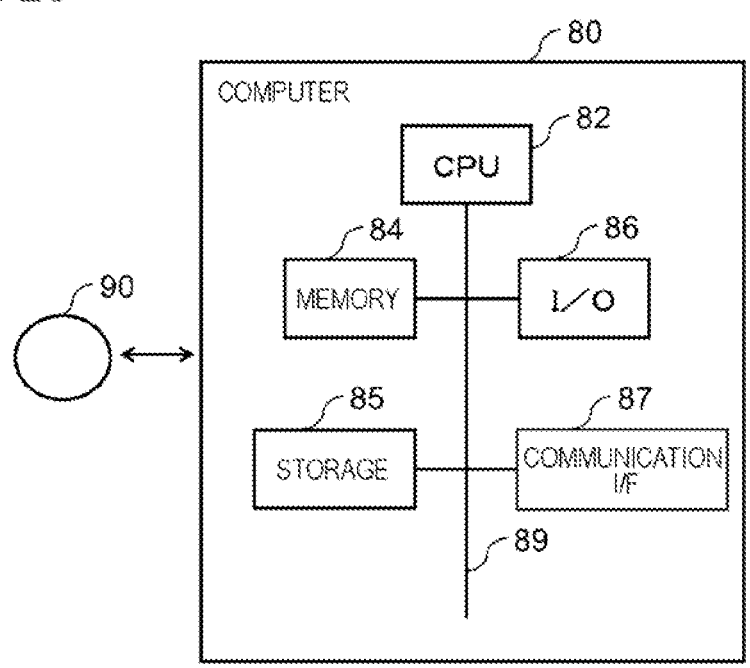
FIG. 26 is a diagram illustrating an example of a computer implementing the information processing apparatus of each example embodiment.

FIG. 26 is a diagram illustrating an example of a configuration of a computer 80 implementing the information processing apparatus 100 of each of the above-described example embodiments.

The computer 80 includes a central processing unit (CPU) 82, a memory 84, a program 90, loaded to the memory 84, for implementing the constituent elements of each information processing apparatus 100 in FIGS. 2, 9, and 11, a storage 85 storing the program 90, an input/output (I/O) 86, and a network connection interface (communication I/F 87).

The CPU 82, the memory 84, the storage 85, the I/O 86, and the communication I/F 87 are connected to each other through a bus 89, and the entire information processing apparatus is controlled by the CPU 82. However, a method of connecting the CPU 82 and the like to each other is not limited to bus connection.

The memory 84 is a memory such as a random access memory (RAM) or a read only memory (ROM). The storage 85 is a storage apparatus such as a hard disk, a solid state drive (SSD), or a memory card.

The storage 85 may be a memory such as a RAM or a ROM. The storage 85 may be provided in the computer 80, may be provided outside the computer 80 as long as the computer 80 can assess the storage, and may be connected to the computer 80 in a wired or wireless manner. Alternatively, the storage may be provided to be attachable to and detachable from the computer 80.

The CPU 82 reads the program 90 stored in the storage 85 to the memory 84 and executes the program, and can thus realize the function of each unit of the information processing apparatus 100 of each example embodiment.

The I/O 86 controls input and output of data and a control signal among the computer 80 and other input and output apparatuses. The other input and output apparatuses include, for example, input apparatuses (not illustrated) such as a keyboard, a touch panel, a mouse, and a microphone connected to the computer 80, output apparatuses (not illustrated) such as a display, a printer, and a speaker, and an interface among the computer 80 and the input and output apparatuses. The I/O 86 may control input and output of data with other reading or writing apparatuses (not illustrated) for a storage medium.

The communication I/F 87 is a network connection interface performing communication between the computer 80 and an external apparatus. The communication I/F 87 may be a network interface for connection to a cable line, and may be a network interface for connection to a radio line. For example, the computer 80 implementing the information processing apparatus 100 is connected to at least one camera 5 through a network by using the communication I/F 87.

Each constituent element of the information processing apparatus 100 of each example embodiment is realized by any combination of hardware and software of the computer 80 in FIG. 26. It is understood by a person skilled in the art that there are various modification examples in a realization method and a realization apparatus. The functional block diagram illustrating the information processing apparatus 100 of each of the above-described example embodiments indicates a block in the logical functional unit instead of a configuration in the hardware unit.

The information processing apparatus 100 may be configured with a plurality of computers 80, and may be realized by a virtual server.

As the example of being configured with a plurality of computers 80, the present invention may be realized as an information processing system exemplified below, but is not limited thereto.

(1) The extraction unit 104 and the collation unit 102 are implemented by different apparatuses (computers 80). For example, the information processing system may include a terminal apparatus having the extraction unit 104 and a server apparatus having the collation unit 102.

(2) A storage unit implementing the second feature information storage unit 110 and the first feature information storage unit 112 may be implemented by a plurality of apparatuses. For example, a storage device storing second feature information extracted from a person included in the first image may be provided separately from a storage apparatus storing identification information and second feature information of a specific person.

(3) Among extraction processes performed by the extraction unit 104, a process of extracting feature information from the first image 10 and a process of extracting feature information from the second image 22 are performed by different apparatuses (computers 80). For example, the information processing system may include a plurality of terminal apparatuses having the extraction unit 104 and analyzing videos, and a server apparatus integrating information therefrom and performing a collation process. The plurality of terminal apparatuses may be disposed to be distributed to respective regions, and the extraction unit 102 may be implemented by a plurality of physical apparatuses.

(4) Different apparatuses (computers 80) may be used depending on the type (face feature information and person region feature information) of feature information which is a target of video analysis (the extraction unit 104 and the collation unit 102).

As mentioned above, the example embodiments of the present invention have been described with reference to the drawings, but these are examples of the present invention, and various configurations other than the description may be employed.

For example, in the above-described example embodiment, a first collation process between feature information extracted from a person region of a person included in the first image 10 and the first feature information 14a of a retrieval target person, and a second collation process between second feature information extracted from a facial region of a person in the first image 10, indicating a match in the collation process, and face feature information of a registered person, are performed. In other example embodiments, the collation unit 102 may perform at least either one of the first collation process and the second collation process with respect to a third image which is different from the first image 10 and the second image 22 by using the first feature information 14a and the second feature information.

In this configuration, in a case where a facial region can be detected from the third image, the second collation process with the second feature information may be performed instead of the first collation process with the first feature information 14a. In a case where a facial region cannot be detected from the third image, the first collation process with the first feature information 14a may be performed. New second feature information generated through the first collation process may be stored in the second feature information storage unit 110.

According to this configuration, it is possible to retrieve a retrieval target person from the third image by performing a collation process using the first feature information 14a or the second feature information which is already acquired, on the third image captured at the date and time or a location which is different from that of the first image 10.

In the above-described example embodiment, a description has been made of an example in which the first feature information is feature information extracted from a first portion of a person region, and the second feature information is feature information from a second portion of the person region, for example, a facial region, but there may be other combinations of the first feature information and the second feature information.

As a first example, the first feature information may be information indicating at least one of colors of clothes, the age, the sex, and the height of a person, and the second feature information may be face feature information of a person.

In this example, for example, in a case where a face of a retrieval target person is not captured in the second image 22, and thus face recognition cannot be performed, instead of performing a process of extracting the first feature information 14a from a person region in the second image 22, at least one of colors of clothes, the age, the sex, and the height of a retrieval target person may be specified through an operator's operation, and may be stored in the first feature information storage unit 112 as the first feature information 14a. In this example, an operation reception portion (not illustrated) for receiving input of the first feature information of a retrieval target person may be provided on a screen along with the retrieval target display section 202 in which the second image 22 is displayed. The operator may input the first feature information of the person while viewing an image of the retrieval target person displayed in the retrieval target display section 202.

As a second example, the first feature information may be feature information of the entire person region, and the second feature information may be a plurality of pieces of biological recognition information for performing a multimodal biological recognition process in which a plurality of pieces of biological information are combined with each other.

This example may be applied, for example, in a case where a face of a retrieval target person is not captured in the second image 22, and thus face recognition is hard to perform, and the lower half of the body is not also captured, and thus gait recognition is also hard to perform. The first feature information 14a may be extracted from a person region of a person captured in the second image 22, a candidate may be detected from the first image 10 by using the first feature information 14a, and a person may be identified through a multimodal biological recognition process on the detected candidate by using a plurality of pieces of biological information as the second feature information.

As mentioned above, the present invention has been described with reference to the example embodiments and the Examples, but the present invention is not limited to the example embodiments and Examples. The configuration or details of the present invention may be subjected to various changes which can be understood by a person skilled in the art within the scope of the present invention.

It should be noted that acquisition and use of information regarding a user in the present invention are assumed to be performed legally.

Some or all of the above-described example embodiments may be disclosed as in the following appendix, but are not limited thereto.

1. An information processing apparatus including:
   an acquisition unit that acquires
   a first image from which person region feature information regarding a region including other than a face of a retrieval target person is extracted,
   a second image in which a collation result with the person region feature information indicates a match, and a facial region is detected, and
   result information indicating a collation result between face information stored in a storage unit and face information extracted from the facial region; and
   a display processing unit that displays at least two of the first image, the second image, and the result information on an identical screen.

2. An information processing apparatus including:
an acquisition unit that acquires
- a second image in which a collation result with person region feature information regarding a region including other than a face of a retrieval target person indicates a match, and a facial region is detected, and
- result information indicating a collation result between face information stored in a storage unit and face information extracted from the facial region; and a display processing unit that displays the acquired second image and result information on an identical screen.

3. An information processing apparatus including:
an acquisition unit that acquires
- a first image from which person region feature information regarding a region including other than a face of a retrieval target person is extracted, and
- result information indicating a collation result between face information extracted from a second image in which a collation result with the person region feature information indicates a match, and a face information stored in a storage unit; and a display processing unit that displays the acquired first image and result information on an identical screen.

4. The information processing apparatus according to any one of 1. to 3.,
in which the acquisition unit acquires a plurality of the second images, and
in which the display processing unit displays the result information for each of the plurality of acquired second images.

5. The information processing apparatus according to any one of 1. to 4.,
in which the display processing unit displays the first image, the second image, the result information on an identical screen.

6. The information processing apparatus according to any one of 1. to 5.,
in which the display processing unit displays the first image and the second image on an identical screen.

7. The information processing apparatus according to 6.,
in which the acquisition unit acquires a plurality of the second images, and
in which in a case where a selection operation of selecting at least one image from among the plurality of second images is received, the display processing unit displays the result information for the selected second image.

8. The information processing apparatus according to any one of 1. to 7.,
in which face feature information of a specific person is stored in a storage unit in association with information regarding the specific person, and
in which the result information includes at least one of the matching degree with the face feature information stored in the storage unit and the information regarding the specific person.

9. The information processing apparatus according to 8.,
in which the information regarding the specific person includes at least one of a face picture and identification information of the specific person.

10. An information processing method executer by an information processing apparatus, the method including:
acquiring
- a first image from used to generate person region feature information indicating a feature of a retrieval target person,
- a second image in which a collation result with the person region feature information indicates a match, and a facial region is detected, and
- result information indicating a collation result between face information stored in a storage unit and face information extracted from the facial region, and displaying at least two of the first image, the second image, and the result information on an identical screen.

11. An information processing method executer by an information processing apparatus, the method including:
acquiring
- a second image in which a collation result with person region feature information regarding a region including other than a face of a retrieval target person indicates a match, and a facial region is detected, and
- result information indicating a collation result between face information stored in a storage unit and face information extracted from the facial region, and displaying the acquired second image and result information on an identical screen.

12. An information processing method executer by an information processing apparatus, the method including:
acquiring
- a first image from which person region feature information regarding a region including other than a face of a retrieval target person is extracted, and
- result information indicating a collation result between face information extracted from a second image in which a collation result with the person region feature information indicates a match, and a face information stored in a storage unit, and displaying the acquired first image and result information on an identical screen.

13. The information processing method executer by an information processing apparatus, according to any one of 10. to 12., the method including:
acquiring a plurality of the second images; and
displaying the result information for each of the plurality of acquired second images.

14. The information processing method executer by an information processing apparatus, according to any one of 10. to 13., the method including:
displaying the first image, the second image, the result information on an identical screen.

15. The information processing method executer by an information processing apparatus, according to any one of 10. to 14., the method including:
displaying the first image and the second image on an identical screen.

16. The information processing method executer by an information processing apparatus, according to 15., the method including:
acquiring a plurality of the second images; and
displaying, in a case where a selection operation of selecting at least one image from among the plurality of second images is received, the result information for the selected second image.

17. The information processing method executer by an information processing apparatus, according to any one of 10. to 16., the method including:
storing face feature information of a specific person in a storage unit in association with information regarding the specific person, and
in which the result information includes at least one of the matching degree with the face feature information stored in the storage unit and the information regarding the specific person.

18. The information processing method according to 17.,
in which the information regarding the specific person includes at least one of a face picture and identification information of the specific person.

19. A program causing the computer to execute:
a procedure of acquiring
a first image used to generate person region feature information indicating a feature of a retrieval target person,
a second image in which a collation result with the person region feature information indicates a match, and a facial region is detected, and
result information indicating a collation result between face information stored in a storage unit and face information extracted from the facial region; and
a procedure of displaying at least two of the first image, the second image, and the result information on an identical screen.

20. A program causing the computer to execute:
a procedure of acquiring
a second image in which a collation result with person region feature information regarding a region including other than a face of a retrieval target person indicates a match, and a facial region is detected, and
result information indicating a collation result between face information stored in a storage unit and face information extracted from the facial region; and
a procedure of displaying the acquired second image and result information on an identical screen.

21. A program causing the computer to execute:
a procedure of acquiring
a first image from which person region feature information regarding a region including other than a face of a retrieval target person is extracted, and
result information indicating a collation result between face information extracted from a second image in which a collation result with the person region feature information indicates a match, and a face information stored in a storage unit; and
a procedure of displaying the acquired first image and result information on an identical screen.

22. The program according to any one of 19. to 21., causing the computer to execute:
a procedure of acquiring a plurality of the second images; and
a procedure of displaying the result information for each of the plurality of acquired second images.

23. The program according to any one of 19. to 22., causing the computer to execute
a procedure of displaying the first image, the second image, the result information on an identical screen.

24. The program according to any one of 19. to 23., causing the computer to execute
a procedure of displaying the first image and the second image on an identical screen.

25. The program according to 15., causing the computer to execute
a procedure of acquiring a plurality of the second images, and
a procedure of displaying, in a case where a selection operation of selecting at least one image from among the plurality of second images is received, the result information for the selected second image.

26. The program according to any one of 19. to 25.,
in which face feature information of a specific person is stored in a storage unit in association with information regarding the specific person, and
in which the result information includes at least one of the matching degree with the face feature information stored in the storage unit and the information regarding the specific person.

27. The program according to 26.,
in which the information regarding the specific person includes at least one of a face picture and identification information of the specific person.

The invention claimed is:

1. An information processing apparatus comprising:
a memory configured to store instructions; and
a processor configured to execute the instructions to:
acquire first feature information other than a facial region of a target person, wherein the first feature information corresponds to a first image,
acquire second feature information containing a first facial region, wherein the second feature information corresponds to a second image,
determine a first collation result between the first feature information and the second feature information,
acquire third feature information containing a second facial region, wherein the third feature information corresponds to a third image,
determine a third collation result between the first feature information and the third feature information,
when the first collation result is greater than the third collation result, select the second feature information for determining a second collation result,
determine the second collation result between a face in the first facial region of the second feature information and first predetermined facial information,
generate output information comprising the first feature information, the first collation result, and the second collation result, and
display, on a screen, the output information in which the first feature information, the first collation result, and the second collation result are arranged in a horizontal direction and in this order.

2. The apparatus as claimed in claim 1, wherein the first collation result in the output information includes the second feature information corresponding to the first collation result.

3. The apparatus as claimed in claim 1, wherein the output information comprises a plurality of the second collation results, and
the processor is configured to display the output information in which the plurality of the second collation results are arranged in a vertical direction.

4. The apparatus as claimed in claim 1, wherein the output information comprises a plurality of the first collation results, and
the processor is configured to display the output information in which the plurality of the first collation results are arranged in a vertical direction.

5. The apparatus as claimed in claim 1, wherein the output information comprises at least one of the second collation results corresponding to each of at least one of the first collation results, and
the processor is configured to display the at least one of the second collation results corresponding to each of the at least one of the first collation results on a right side of a corresponding first collation result.

6. The apparatus as claimed in claim 1, wherein the processor is configured to
generate the output information every time any one of the first image, the second image, and result information is acquired, and
display the output information every time the output information is generated.

7. The apparatus as claimed in claim 1, wherein the processor is configured to determine the second collation result when the first collation result indicates a match between the first feature information and the second feature information.

8. The apparatus as claimed in claim 7, wherein the first collation result indicates the match when a value of the first collation result is greater than a predetermined threshold.

9. The apparatus as claimed in claim 1, wherein, when the third collation result is greater than the first collation result, the processor is configured to:
select the third feature information, and
determine a fourth collation result between the face in the second facial region of the third feature information and the first predetermined facial information.

10. The apparatus as claimed in claim 9, wherein the output information comprises at least the second collation result for the second feature information when the first collation result is greater than the third collation result, and
wherein the output information comprises at least the fourth collation result for the third feature information when the third collation result is greater than the first collation result.

11. The apparatus as claimed in claim 1, wherein the output information comprises at least the second collation result for the second feature information and the third collation result for the third feature information.

12. The apparatus as claimed in claim 11, wherein the processor is configured to display the second feature information and the third feature information based on values of the first collation result and the third collation result.

13. The apparatus as claimed in claim 12, wherein the processor is configured to display the second feature information and the third feature information in a descending order of the values of the first collation result and the third collation result.

14. The apparatus as claimed in claim 1, wherein the first predetermined facial information comprises information associated with an identity of a specific person, and
wherein the second collation result indicates a likelihood that the first feature information corresponds to the specific person.

15. The apparatus as claimed in claim 14, wherein the information associated with the identity of the specific person comprises at least one facial image of the specific person.

16. The apparatus as claimed in claim 15, wherein the information associated with the identity of the specific person further comprises additional information identifying the specific person.

17. The apparatus as claimed in claim 1, wherein the processor is further configured to:
determine a fourth collation result between the face in the first facial region of the second feature information and second predetermined facial information,
the output information that is generated further comprising the third collation result.

18. The apparatus as claimed in claim 17, wherein the processor is configured to display the first predetermined facial information and the second predetermined facial information based on values of the second collation result and the fourth collation result.

19. The apparatus as claimed in claim 18, wherein the processor is configured to display the first predetermined facial information and the second predetermined facial information in a descending order of the values of the second collation result and the fourth collation result.

20. An information processing method comprising:
acquire first feature information other than a facial region of a target person, wherein the first feature information corresponds to a first image,
acquire second feature information containing a first facial region, wherein the second feature information corresponds to a second image,
determine a first collation result between the first feature information and the second feature information,
acquire third feature information containing a second facial region, wherein the third feature information corresponds to a third image,
determine a third collation result between the first feature information and the third feature information,
when the first collation result is greater than the third collation result, select the second feature information for determining a second collation result,
determine the second collation result between a face in the first facial region of the second feature information and first predetermined facial information,
output information comprising the first feature information, the first collation result, and the second collation result, and
display, on a screen, the output information in which the first feature information, the first collation result, and the second collation result are arranged in a horizontal direction and in this order.

21. A non-transitory computer readable medium storing instructions that when executed by a processor instruct the processor to:
acquire first feature information other than a facial region of a target person, wherein the first feature information corresponds to a first image,
acquire second feature information containing a first facial region, wherein the second feature information corresponds to a second image,
determine a first collation result between the first feature information and the second feature information,
acquire third feature information containing a second facial region, wherein the third feature information corresponds to a third image,
determine a third collation result between the first feature information and the third feature information,
when the first collation result is greater than the third collation result, select the second feature information for determining a second collation result,
determine the second collation result between a face in the first facial region of the second feature information and first predetermined facial information,
output information comprising the first feature information, the first collation result, and the second collation result, and
display, on a screen, the output information in which the first feature information, the first collation result, and the second collation result are arranged in a horizontal direction and in this order.

* * * * *